(12) United States Patent
Miyashita et al.

(10) Patent No.: US 8,305,859 B2
(45) Date of Patent: Nov. 6, 2012

(54) INFORMATION RECORDING MEDIUM AND INFORMATION RECORDING MEDIUM EVALUATION METHOD

(75) Inventors: Harumitsu Miyashita, Nara (JP); Kohei Nakata, Nara (JP)

(73) Assignee: Panasonic Corporation, Osaka (JP)

( * ) Notice: Subject to any disclaimer, the term of this patent is extended or adjusted under 35 U.S.C. 154(b) by 999 days.

(21) Appl. No.: 12/332,536

(22) Filed: Dec. 11, 2008

(65) Prior Publication Data

US 2009/0180375 A1    Jul. 16, 2009

Related U.S. Application Data

(60) Provisional application No. 61/012,823, filed on Dec. 11, 2007, provisional application No. 61/120,874, filed on Dec. 9, 2008.

(51) Int. Cl.
*G11B 5/09* (2006.01)
*G11B 20/10* (2006.01)
*G11B 15/00* (2006.01)

(52) U.S. Cl. .................................. 369/59.15; 369/47.46

(58) Field of Classification Search ........................ None
See application file for complete search history.

(56) References Cited

U.S. PATENT DOCUMENTS

| | | | |
|---|---|---|---|
| 5,737,287 A | 4/1998 | Lee | |
| 5,872,763 A | 2/1999 | Osakabe | |
| 2001/0055169 A1 | 12/2001 | Noda et al. | |
| 2003/0227852 A1 | 12/2003 | Ogawa | |
| 2004/0196776 A1* | 10/2004 | Yoshida et al. | 369/275.1 |
| 2004/0228244 A1* | 11/2004 | Kim et al. | 369/52.1 |
| 2005/0058034 A1* | 3/2005 | Ando et al. | 369/47.27 |
| 2006/0146673 A1 | 7/2006 | Shoji et al. | |
| 2007/0237060 A1* | 10/2007 | Ohno et al. | 369/275.1 |
| 2007/0274186 A1* | 11/2007 | Maeda | 369/59.11 |
| 2007/0291621 A1 | 12/2007 | Aoyama et al. | |
| 2008/0025180 A1* | 1/2008 | Aoyama et al. | 369/59.12 |
| 2009/0180375 A1* | 7/2009 | Miyashita et al. | 369/283 |

FOREIGN PATENT DOCUMENTS

| | | |
|---|---|---|
| JP | 09-161272 | 6/1997 |
| JP | 2001-291325 | 10/2001 |
| JP | 3259642 | 12/2001 |
| JP | 2002-123937 | 4/2002 |
| JP | 2004-280876 | 10/2004 |
| JP | 2006-147125 | 6/2006 |
| JP | 2007-317334 | 12/2007 |

OTHER PUBLICATIONS

International Search Report for corresponding application No. PCT/JP2008/003726 issued Mar. 17, 2009.
PCT/ISA/237 and a partial English translation.
Blu-ray Disc Reader, published by Ohmsha, Ltd., pp. 13-28 with a concise explanation.
White paper, Blu-ray Disc Format, General, Aug. 2004, pp. 1-37.
White paper, Blu-ray Disc Format, 3. File System Specifications for BD-RE, R, ROM, Aug. 2004, pp. 1-6.
White paper, Blu-ray Disc Format, 4. Key Technologies, Aug. 2004, pp. 1-8.

* cited by examiner

*Primary Examiner* — Mohammad Ghayour
*Assistant Examiner* — Carl Adams
(74) *Attorney, Agent, or Firm* — Renner, Otto, Boiselle & Sklar, LLP

(57) ABSTRACT

An information recording medium according to the present invention includes an information recording layer on which information is recordable, and is evaluated using an evaluation index which is found based on a ratio of a center of an amplitude of a reproduction signal corresponding to a second shortest mark and a second shortest space, with respect to a center of an amplitude of a reproduction signal corresponding to a longest mark and a longest space.

2 Claims, 14 Drawing Sheets

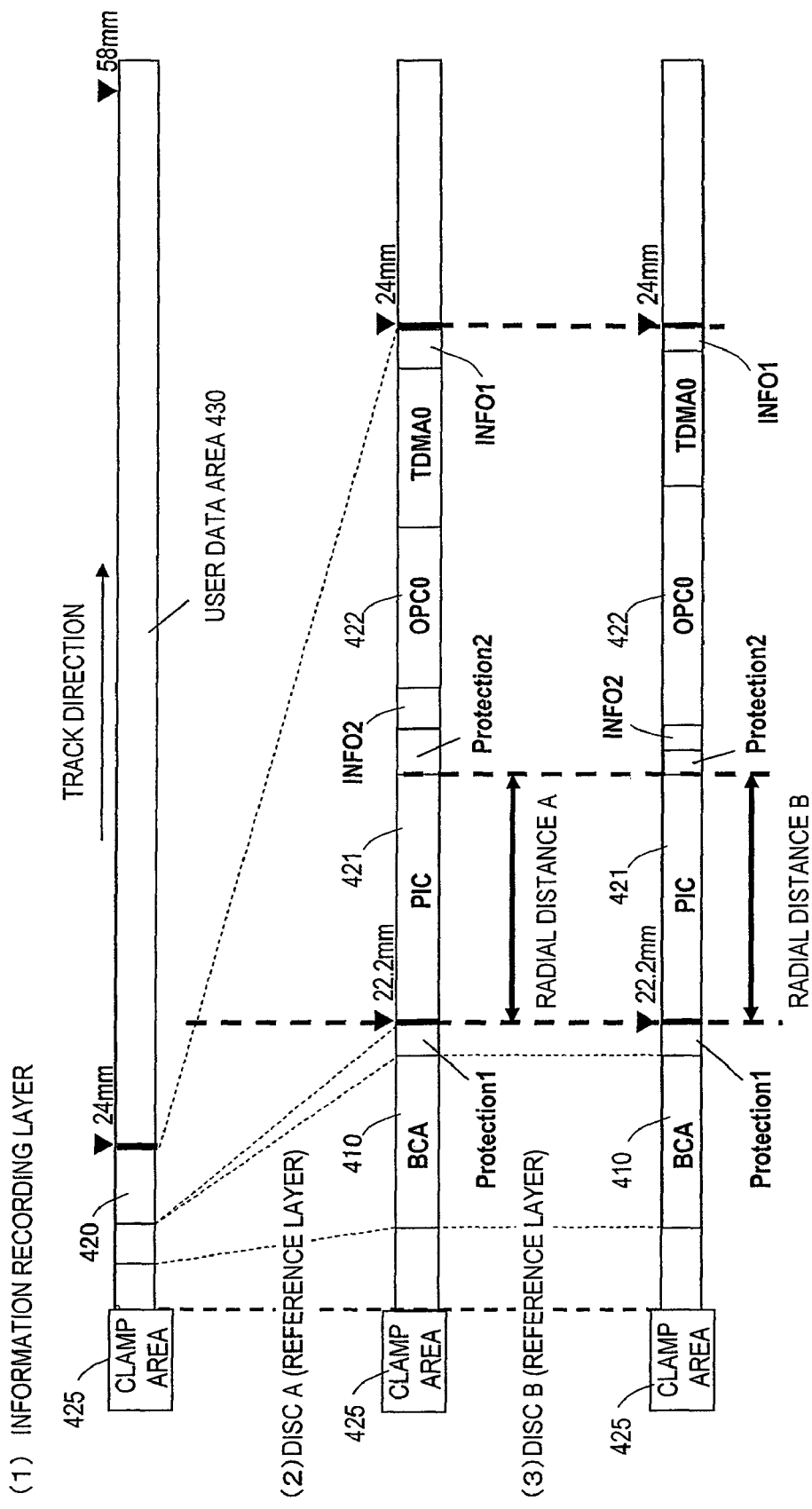

TRACK 131    SHORTEST MARK 132    OPTICAL BEAM SPOT 133

INFORMATION RECORDING MEDIUM AND INFORMATION RECORDING MEDIUM EVALUATION METHOD

BACKGROUND OF THE INVENTION

1. Field of the Invention

The present invention relates to a method for defining the amplitude ratio of a recording mark to be recorded on an information recording medium such as an optical disc or the like and a space. In particular, the present invention relates to a method for adaptably changing the defining technique in accordance with the recording linear density so as to control the recording quality of the recording medium to be within a prescribed range and thus to easily make an optical disc apparatus compatible for recording and reproduction.

2. Description of the Related Art

For example, for an optical disc drive (optical disc apparatus) for recording information on write once optical discs (CD-R, DVD-R, BD-R) or recordable optical discs (CD-RW, DVD-RW, BD-RE) using laser light, it is the most important issue to guarantee the recording quality of information recorded on the optical disc. However, the recording quality of the information recorded on an optical disc depends on various conditions including the using environment of the drive and the temperature when the information is recorded, as well as various conditions including the type of the optical disc and variance among individual optical disc products. Thus, unless information is written by laser light of a recording power suitable to the various conditions at the time of information recording, the information cannot be correctly written. This results in malfunctioning such that, for example, the information cannot be read, or the information which is read is not correct.

In order to stabilize the recording quality of the information recorded on an optical disc, an optical disc apparatus finds the optimum recording laser power for information recording before recording the information on the optical disc. For example, there is a system of finding the optimum recording laser power for information recording by calibration (Optimum Power Control; referred to simply as "OPC"). OPC is performed as follows. Prescribed information is recorded in a power calibration area (referred to simply as "PCA") of an optical disc while the laser power is changed to a plurality of steps, and the information recorded at each step is reproduced. The maximum value (peak value) A1 and the minimum value (bottom value) A2 of the amplitude of the resultant RF signal with respect to a reference level C are detected. Based on the maximum value A1 and the minimum value A2, a β value is found by the following expression (1).

$$\beta = (A1 + A2)/(A1 - A2) \quad (1)$$

The laser power at which the obtained β value is a prescribed value is set as the optimum recording laser power for recording, and the information is recorded in the recording area of the optical disc at the optimum recording laser power (see, for example, Patent Document 1 (Japanese Patent No. 3259642)).

The OPC is also performed as follows. Prescribed information is recorded in the power calibration area of an optical disc while the laser power is changed to a plurality of steps, and the information recorded at each step is reproduced. The maximum value (peak value) B1 and the minimum value (bottom value) B2 of the resultant RF signal with respect to a reference level D are detected. Based on the maximum value B1 and the minimum value B2, the modulation degree value is found by the following expression (2).

$$\text{Modulation degree value} = (B1 - B2)/B2 \quad (2)$$

The laser power at which the obtained modulation degree value is a prescribed value is set as the optimum recording laser power for recording, and the information is recorded in the recording area of the optical disc at the optimum recording laser power (see, for example, Patent Document 2 (Japanese Laid-Open Patent Publication No. 2006-147125)).

FIG. 17 shows the relationship between an RF signal 110 used for finding the β value and the modulation degree value, and the above-mentioned parameters. The reference level C used for finding the β value is an average level of all the amplitudes of the RF signal, and is an amplitude level equal to the level of a signal which has passed an HPF which is set to pass a prescribed band of signals. Based on the reference level C, the maximum value A1 and the minimum value A2 of the amplitude of the RF signal are found, and the β value is found by expression (1) above.

The reference level D used for finding the modulation degree value is a DC level acting as the reference based on which the amplitude of the RF signal is measured. The reference level D is, for example, an amplitude level equal to the level of a signal when the laser light is extinct. Based on the reference level D, the maximum value B1 and the minimum value B2 of the amplitude of the RF signal are found, and the modulation degree value is found by the expression (2) above.

Conventionally, by using a signal measurement index such as the β value or the modulation degree value to find the optimum recording laser power, the deterioration of the recording quality of information recorded on the optical disc is prevented.

The recording linear density will be described with reference to FIG. 19 and FIG. 20 with a specific example of a BD. Like in a DVD, in the BD also, the recording data is recorded as marks formed by a physical change on the optical disc. A mark having the shortest length among these marks is the "shortest mark 132". In the case of the BD having a recording capacity of 25 GB, the physical length of the shortest mark is 0.149 μm. This corresponds to about 1/2.7 of that of a DVD. Even if the resolving power of the laser light is raised by changing the parameters of the wavelength (405 nm) and the NA (0.85) of the optical system, the physical length of the shortest mark is close to the limit of the optical resolving power, i.e., the limit at which a light beam can identify a recording mark. FIG. 19 shows how a mark recorded on a track 131 is irradiated with a light beam. In the BD, an optical spot 133 has a diameter of about 0.39 μm because of the above-mentioned parameters of the optical system. When the recording linear density is raised without changing the structure of the optical system, the recording mark becomes small with respect to the diameter of the optical spot, and therefore the resolving power for reproduction is declined.

An amplitude of a reproduction signal obtained by reproducing a recording mark using a light beam decreases as the recording mark is shortened, and becomes almost zero at the limit of the optical resolving power. The inverse of the cycle of the recording mark is called "spatial frequency", and the relationship between the spatial frequency and the signal amplitude is called OTF (Optical Transfer Function). The signal amplitude decreases almost linearly as the spatial frequency increases. The critical frequency for reproduction at which the signal amplitude becomes zero is called "OTF cutoff".

FIG. 20 shows the relationship between the OTF and the shortest recording mark regarding the BD having a recording capacity of 25 GB. The spatial frequency of the shortest recording mark of the BD is about 80% with respect to the OTF cutoff, which is close to the OTF cutoff. It is also seen that the amplitude of the reproduction signal of the shortest mark is very small at about 10%. For the BD, the recording capacity at which the spatial frequency of the shortest recording mark is the OTF cutoff, i.e., the recording capacity at which the reproduction amplitude of the shortest mark is almost zero, is about 31 GB. When the frequency of the reproduction signal of the shortest mark is around, or exceeds, the OTF cutoff frequency, the resolving power of the laser light is close to the limit or may exceed the limit. In such an area, the amplitude of the reproduction signal decreases and the S/N ratio is drastically deteriorated.

Now, as indices for defining the recording quality, an asymmetry evaluation index and a P evaluation index will be described.

FIG. 18 shows amplitude levels of a reproduction signal obtained from the longest mark/space (8T) and a reproduction signal obtained from the shortest mark/space (2T). This figure shows a definition of parameters used for calculating the asymmetry evaluation index value. In the case of a medium in which the reflectance of a recorded area is lower than the reflectance of an unrecorded area, the reproduction signal amplitude level of an 8T space is defined as amplitude A8H from reference level 0, the reproduction signal amplitude level of an 8T mark is defined as amplitude A8L from reference level 0, the reproduction signal amplitude level of a 2T space is defined as amplitude A2H from reference level 0, and the reproduction signal amplitude level of a 2T mark is defined as amplitude A2L from reference level 0. The asymmetry evaluation index value (ASYM) is found by the following expression (3).

$$ASYM = \frac{\frac{A8H + A8L}{2} - \frac{A2H + A2L}{2}}{A8H - A8L} \quad (3)$$

With this index value, it can be defined how much the center of the amplitude of the reproduction signal of the shortest mark/space (2T) or the center of the amplitude of the reproduction signal of the longest mark/space (8T) is DC-shifted with respect to the entire amplitude of the reproduction signal of the longest mark/space (8T). In order to maintain the recording quality to a prescribed level or higher, the recording is controlled such that the asymmetry evaluation index value (ASYM) is within a prescribed range. For example, the asymmetry evaluation index value is restricted to $-0.1 \leq ASYM \leq 0.1$.

However, where the recording linear density is raised and so the frequency of the shortest mark is around, or exceeds, the OTF cutoff frequency, the shortest mark exceeds the optical resolving power. As a result, the amplitude of the reproduction signal is decreased, or does not exceed the reference level due to the influence of inter-code interference. For these reasons, the asymmetry evaluation index value cannot be appropriately found in some cases in an area having a recording linear density exceeding a prescribed level. Namely, in some cases, with the asymmetry evaluation index value, the recording quality cannot be appropriately defined, or the recording quality of the recording medium cannot be controlled to be within a prescribed range. As a result, the recording/reproduction compatibility of the optical disc apparatus cannot be stably maintained.

SUMMARY OF THE INVENTION

An information recording medium according to the present invention is an information recording medium including an information recording layer on which information is recordable, wherein the information recording medium is evaluated using an evaluation index which is found based on a ratio of a center of an amplitude of a reproduction signal corresponding to a second shortest mark and a second shortest space, with respect to a center of an amplitude of a reproduction signal corresponding to a longest mark and a longest space.

In an embodiment, where the information recording layer has a first recording density, the information recording medium is evaluated using a first evaluation index which is found based on a ratio of a center of an amplitude of a reproduction signal corresponding to a shortest mark and a shortest space, with respect to the center of the amplitude of the reproduction signal corresponding to the longest mark and the longest space; and where the information recording layer has a second recording density which is higher than the first recording density, the information recording medium is evaluated using a second evaluation index which is found based on the ratio of the center of the amplitude of the reproduction signal corresponding to the second shortest mark and the second shortest space, with respect to the center of the amplitude of the reproduction signal corresponding to the longest mark and the longest space.

In an embodiment, a ratio of an amplitude of a reproduction signal corresponding to a recording mark to be recorded on the information recording layer, with respect to an amplitude of a reproduction signal corresponding to a space is restricted such that a value of the evaluation index is within a prescribed range.

In an embodiment, the restriction on the ratio of the amplitude of the reproduction signal corresponding to the recording mark, with respect to the amplitude of the reproduction signal corresponding to the space is any one of restriction made such that the value of the evaluation index is $-0.10$ or higher; restriction made such that the value of the evaluation index is $+0.15$ or lower; and restriction made such that the value of the evaluation index is $-0.10$ or higher and $+0.15$ or lower.

A reproduction method in an embodiment is a method for performing reproduction from the information recording medium. The reproduction method comprises the steps of irradiating the information recording layer with a light beam; receiving light reflected by the information recording layer; and generating a reproduction signal corresponding to a recording mark recorded on the information recording layer based on the received light.

In an embodiment, the information recording medium comprises an area for storing information on a recording density of the information recording layer.

In an embodiment, the information on the recording density indicates a recording capacity of the information recording layer.

In an embodiment, the information recording medium comprises an area for storing information on a recording density of the information recording layer, wherein the information on the recording density indicates a recording capacity of the information recording layer; and where the information recording layer has the first recording density, the recording capacity is 25 gigabytes.

In an embodiment, the information on the recording density indicates a channel bit length of the information recording layer.

In an embodiment, the information recording layer includes a BCA area and a lead-in area; the lead-in area includes a PIC area; and the information on the recording density is recorded in the BCA area or the PIC area.

A reproduction method in an embodiment is a method for performing reproduction from the information recording medium. The reproduction method comprises the step of reproducing the information on the recording density from the BCA area or the PIC area.

In an embodiment, the information recording medium comprises a reference layer, which is an information recording layer located farthest from a light radiation surface of the information recording medium; a first information recording layer located closer to the light radiation surface than the reference layer; and a first spacer layer located between the reference layer and the first information recording layer. The reference layer includes an area for storing information on the recording density.

In an embodiment, the information recording medium further comprises a second information recording layer located closer to the light radiation surface than the first information recording layer; and a second spacer layer located between the first information recording layer and the second information recording layer. The first spacer layer has a larger width than a width of the second spacer layer.

In an embodiment, the information recording layer includes a concentric or spiral track; and where laser light used for irradiating the track has a wavelength of λ nm, an objective lens for collecting the laser light to the track has a numerical aperture NA, a shortest recording mark recordable on the track has a length of TM nm, and a shortest space has a length of TS nm, (TM+TS)<λ÷(2NA).

In an embodiment, TM+TS, which is obtained by adding the length TM of the shortest mark and the length TS of the shortest space, is less than 238.2 nm.

In an embodiment, on the information recording layer, a plurality of types of marks modulated in accordance with a prescribed modulation rule are recordable; and where the reference cycle of the modulation is T, a shortest mark has a length of 2T and a shortest space has a length of 2T.

In an embodiment, where the information recording layer has the first recording density, the information recording medium includes a concentric or spiral track, and where laser light used for irradiating the track has a wavelength of λ nm, an objective lens for collecting the laser light to the track has a numerical aperture NA, a shortest recording mark recorded on the track has a length of TM nm, and a shortest space has a length of TS nm, (TM+TS)>λ÷(2NA); and where the information recording layer has the second recording density, the information recording medium includes a concentric or spiral track, and where laser light used for irradiating the track has a wavelength of λ nm, an objective lens for collecting the laser light to the track has a numerical aperture NA, a shortest recording mark recorded on the track has a length of TM nm, and a shortest space has a length of TS nm, (TM+TS)<λ÷(2NA).

An information recording medium according to the present invention is an information recording medium including an information recording layer on which information is recordable, wherein on the information recording layer, a recording mark restricted to have a length of xT to yT is formed in accordance with a prescribed modulation rule (T is a reference cycle of the modulation, and x and y are natural numbers fulfilling x<y); and the information recording medium is evaluated using an evaluation index which is found based on a ratio of a center of an amplitude of a reproduction signal corresponding to an (x+1)T mark and an (x+1)T space, with respect to a center of an amplitude of a reproduction signal corresponding to a yT mark and a yT space.

In an embodiment, where the information recording layer has a first recording density, the information recording medium is evaluated using a first evaluation index which is found based on a ratio of a center of an amplitude of a reproduction signal corresponding to an xT mark and an xT space, with respect to the center of the amplitude of the reproduction signal corresponding to the yT mark and the yT space; and where the information recording layer has a second recording density which is higher than the first recording density, the information recording medium is evaluated using a second evaluation index which is found based on the ratio of the center of the amplitude of the reproduction signal corresponding to the (x+1)T mark and the (x+1)T space, with respect to the center of the amplitude of the reproduction signal corresponding to the yT mark and the yT space.

A reproduction method in an embodiment is a method for performing reproduction from the information recording medium. The reproduction method comprises the steps of irradiating the information recording layer with a light beam; receiving light reflected by the information recording layer; and generating a reproduction signal corresponding to a recording mark recorded on the information recording layer based on the received light.

In an embodiment, on the information recording layer, information is recorded using a plurality of types of marks having different lengths; and a spatial frequency, which is a frequency of a reproduction signal obtained when at least one of the plurality of types of marks is reproduced, is around, or exceeds, an OTF cutoff frequency.

In an embodiment, on which a plurality of types of marks modulated in accordance with a prescribed modulation rule are recordable, wherein the prescribed modulation rule is 1-7 modulation rule.

In an embodiment, where the information recording layer has the first recording density, information is recorded using a plurality of types of marks having different lengths, and a spatial frequency, which is a frequency of a reproduction signal obtained when at least one of the plurality of types of marks is reproduced, is lower than an OTF cutoff frequency; and where the information recording layer has the second recording density, information is recorded using a plurality of types of marks having different lengths, and a spatial frequency, which is a frequency of a reproduction signal obtained when at least one of the plurality of types of marks is reproduced, is around, or exceeds, the OTF cutoff frequency.

An information recording medium according to the present invention is an information recording medium including an information recording layer on which information is recordable, wherein where the information recording layer has a first recording density, the information recording medium is evaluated using a first evaluation index which is found based on a ratio of a center of an amplitude of a reproduction signal corresponding to a shortest mark and a shortest space, with respect to a center of an amplitude of a reproduction signal corresponding to a longest mark and a longest space; and where the information recording layer has a second recording density which is higher than the first recording density, the information recording medium is evaluated using a second evaluation index which is found based on a ratio of a center of energy of an entire reproduction waveform, with respect to the center of the amplitude of the reproduction signal corresponding to the longest mark and the longest space.

In an embodiment, the relationship between a spatial frequency and a signal amplitude is defined as an OTF; a limit of reproduction, at which the signal amplitude reaches zero after decreasing substantially linearly as the spatial frequency increases, is defined as an OTF cutoff; where the spatial frequency of the shortest mark recorded on the information recording medium is lower than the OTF cutoff frequency, the information recording medium is evaluated using the first evaluation index; and where the spatial frequency of the shortest mark recorded on the information recording medium is around, or exceeds, the OTF cutoff frequency, the information recording medium is evaluated using the second evaluation index.

A reproduction method in an embodiment is a method for reproducing the information recording medium. The reproduction method comprises the steps of irradiating the information recording layer with a light beam; receiving light reflected by the information recording layer; and generating a reproduction signal corresponding to a recording mark recorded on the information recording layer based on the received light.

In an embodiment, in a method for evaluating an information recording medium including an information recording layer on which information is recordable, on the information recording layer, a plurality of types of marks modulated in accordance with a prescribed modulation rule are recordable, and where the reference cycle of the modulation is T, the information recording medium is evaluated using an evaluation index which is found based on a ratio of a center of an amplitude of a reproduction signal corresponding to a 3T mark and a 3T space, with respect to a center of an amplitude of a reproduction signal corresponding to an 8T mark and an 8T space.

In an embodiment, where the information recording layer has a first recording density, the information recording medium is evaluated using a first evaluation index which is found based on a ratio of a center of an amplitude of a reproduction signal corresponding to a 2T mark and a 2T space, with respect to the center of the amplitude of the reproduction signal corresponding to the 8T mark and the 8T space; and where the information recording layer has a second recording density which is higher than the first recording density, the information recording medium is evaluated using a second evaluation index which is found based on the ratio of the center of the amplitude of the reproduction signal corresponding to the 3T mark and the 3T space, with respect to the center of the amplitude of the reproduction signal corresponding to the 8T mark and the 8T space.

A reproduction method in an embodiment is a method for reproducing an information recording medium evaluated by the evaluation method. The reproduction method comprises the steps of irradiating the information recording layer with a light beam; receiving light reflected by the information recording layer; and generating a reproduction signal corresponding to a recording mark recorded on the information recording layer based on the received light.

An evaluation method according to the present invention is a method for evaluating an information recording medium including an information recording layer on which information is recordable. On the information recording layer, a plurality of types of marks modulated in accordance with a prescribed modulation rule are recordable; where the reference cycle of the modulation is T, where the information recording layer has a first recording density, the information recording medium is evaluated using a first evaluation index which is found based on a ratio of a center of an amplitude of a reproduction signal corresponding to a 2T mark and a 2T space, with respect to a center of an amplitude of a reproduction signal corresponding to an 8T mark and an 8T space; and where the information recording layer has a second recording density which is higher than the first recording density, the information recording medium is evaluated using a second evaluation index which is found based on a ratio of a center of energy of an entire reproduction waveform, with respect to the center of the amplitude of the reproduction signal corresponding to the 8T mark and the 8T space.

A reproduction method in an embodiment is a method for reproducing an information recording medium evaluated by the evaluation method. The reproduction method comprises the steps of irradiating the information recording layer with a light beam; receiving light reflected by the information recording layer; and generating a reproduction signal corresponding to a recording mark recorded on the information recording layer based on the received light.

According to the present invention, in an information recording medium such as an optical disc or the like, in an area which has a recording linear density at which the frequency of the shortest mark is sufficiently lower than the OTF cutoff frequency and thus for which the jitter evaluation index is useful, the asymmetry index value based on the 2T amplitude is used for defining the recording quality. Thus, a stable recording medium can be provided. In an area which has a recording linear density at which the frequency of the shortest mark is around, or exceeds, the OTF cutoff frequency and thus for which the jitter evaluation index is not usable and the PR12221ML evaluation index is useful, the β index value based on the center of energy of the entire waveform is used for defining the recording quality. Thus, a stable recording medium can be provided. The recording quality significantly depends on the shape of the recording waveform as well as the recording power relating to the asymmetry index value or the β index value. For defining the recording quality relating to the recording waveform, the jitter index value or the PR12221ML evaluation index is usable. Since the recording quality of the information recorded on a recording medium is defined using a numerical value, a technique suitable to the recording linear density can be used to define the recording quality. As a result, the compatibility of an optical disc apparatus can be maintained stably.

BRIEF DESCRIPTION OF THE DRAWINGS

FIG. 16(B)(1) shows a structure of an information recording layer of a disc A having a conventional recording density and a disc B having a higher recording density, and FIGS. 16B(2) and (3) respectively show a specific structure of a lead-in area 420 of the disc A and the disc B.

DETAILED DESCRIPTION OF PREFERRED EMBODIMENTS (Embodiment 1)

A method for defining the recording quality of a recording medium according to Embodiment 1 of the present invention will be described.

Figure 1:
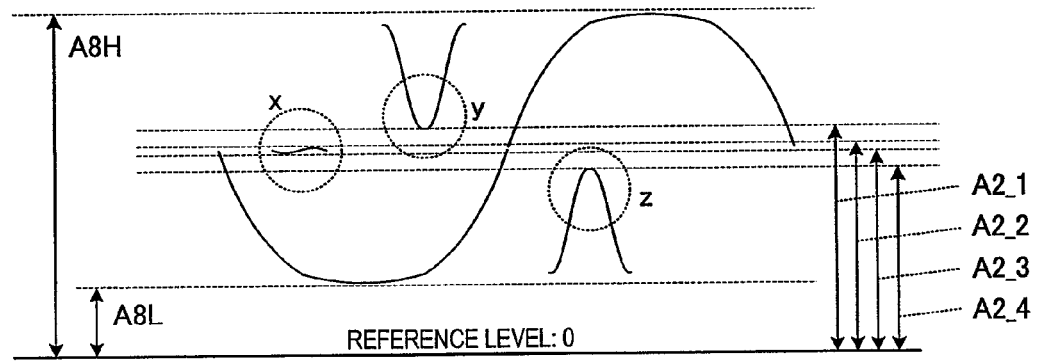
FIG. 1 shows a definition of an amplitude parameter of an RF signal when the recording linear density of an optical disc medium according to an embodiment of the present invention is improved.
Figure 18:
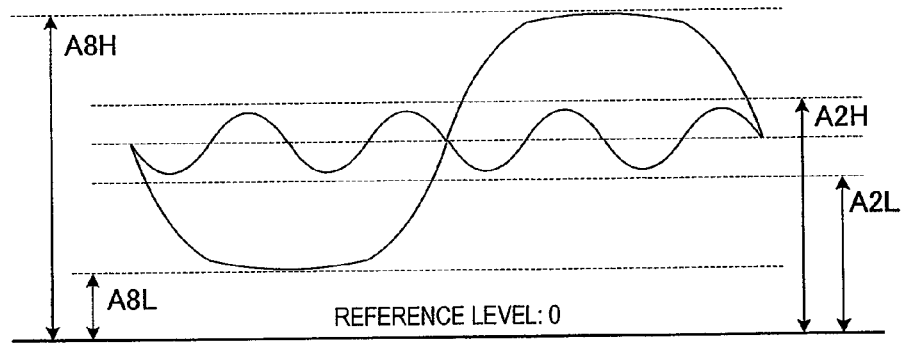
FIG. 18 shows a definition of amplitude parameters of an RF signal for finding asymmetry of an optical disc according to an embodiment of the present invention.
Figure 19:
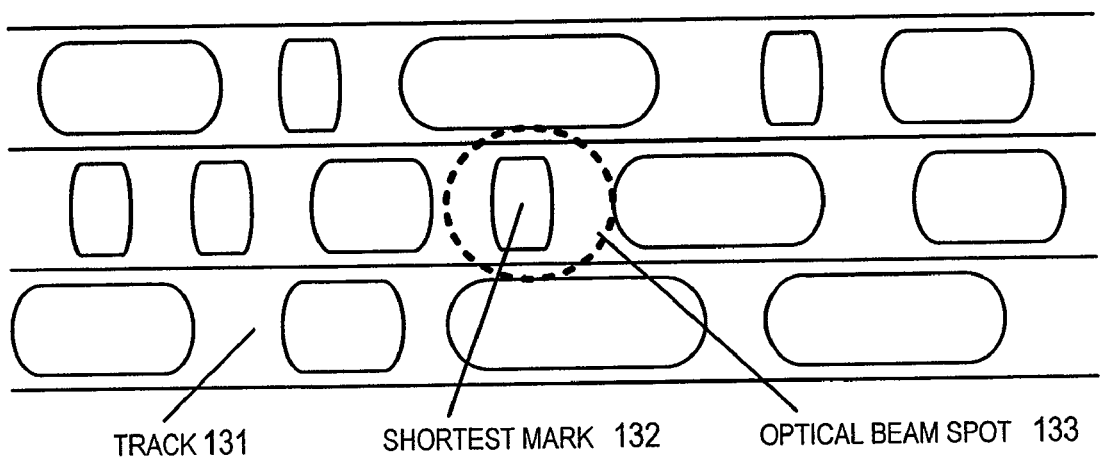
FIG. 19 shows the relationship between marks recorded on a track and the optical beam diameter.
Figure 20:
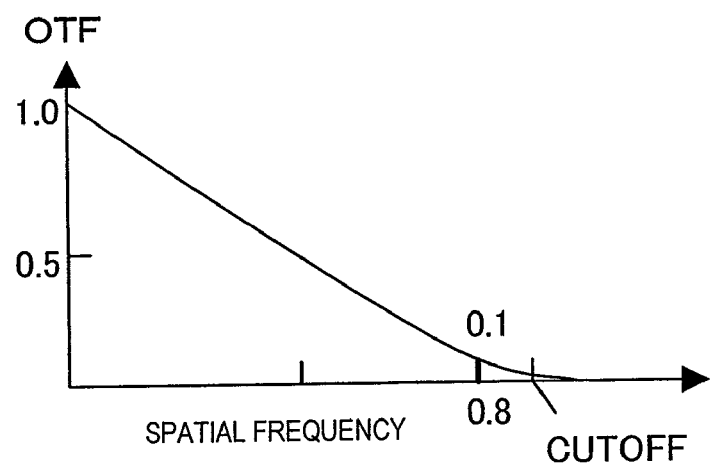
FIG. 20 shows the relationship between the spatial frequency and the OTF.

FIG. 1 shows reproduction signal amplitude levels of the longest mark/space (8T) and the shortest mark/space (2T) shown in FIG. 18. FIG. 1 specifically shows the reproduction signal amplitude levels obtained when reproduction is performed from an area of a BD medium in which recording has been performed at a recording density of 33 GB. The reproduction signal amplitude level of the longest mark/space means an amplitude level of a reproduction signal obtained when a combination of the longest mark and the longest space is reproduced. The reproduction signal amplitude level of the shortest mark/space means an amplitude level of a reproduction signal obtained when a combination of the shortest mark and the shortest space is reproduced.

With reference to FIG. 1, the reproduction signal amplitude level of the shortest mark/space (2T) in an x area indicates that there is no reproduction signal due to OTF. This occurs when, for example, a continuous area of 2T mark and 2T space is reproduced. A y area and a z area indicate that there is no reproduction signal due to inter-code interference. This occurs when, for example, an area of 8T space, 2T mark and 8T space or an area of 8T mark, 2T space and 8T mark is reproduced. As can be seen, when the recording linear density is raised, there are a plurality of reproduction signal amplitude levels A2_2 and A2_4 corresponding to the amplitude level A2H of 2T shown in FIG. 18. Also, there are a plurality of reproduction signal amplitude levels A2_1 and A2_3 corresponding to the amplitude level A2L of 2T shown in FIG. 18. For this reason, the asymmetry evaluation index value cannot be found.

Figure 2:
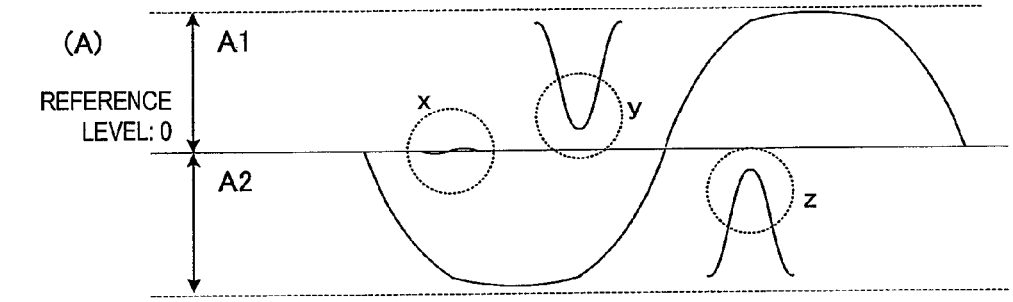
FIGS. 2(A) through (C) show RF signals obtained from an area of an optical disc medium according to an embodiment of the present invention, in which recording has been performed with a raised recording linear density and different levels of recording power.
Figure 2:
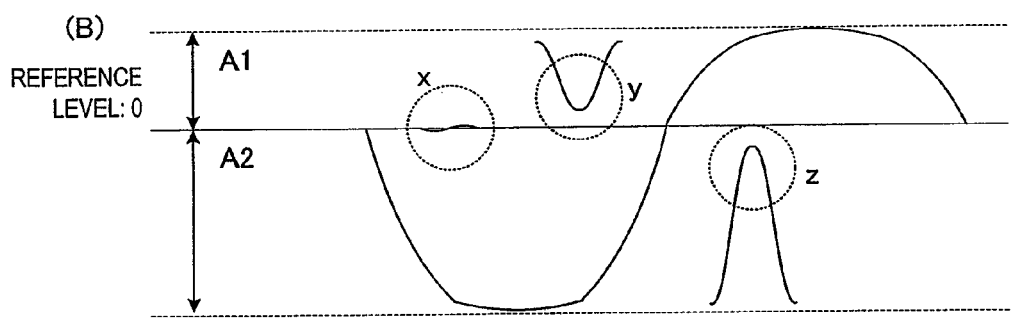
Figure 2:
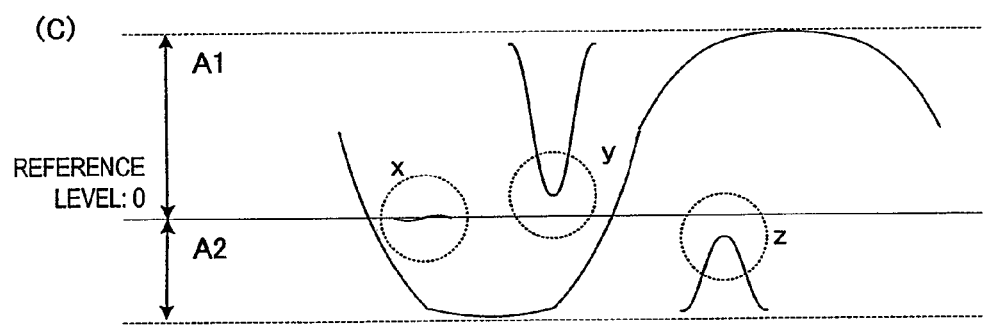

FIGS. 2(A), (B) and (C) each show reproduction signal amplitude levels of the longest mark/space (8T) and the shortest mark/space (2T). These figures each show a definition of parameters for calculating the β evaluation index value. In the case of a medium in which the reflectance of a recorded area is lower than the reflectance of an unrecorded area, the amplitude level of an 8T space is defined as amplitude A1 from reference level 0, and the amplitude level of an 8T mark is defined as amplitude A2 from reference level 0. The reference level 0 is the center of energy of the reproduction waveform. For example, the center of energy of the reproduction waveform is found by allowing a signal to pass an HPF (High Pass Filter) set for a prescribed band. The β evaluation index value (β) is found by expression (1) above.

With this index value, it can be defined how much the center of energy level is DC-shifted with respect to the entire amplitude of the longest mark/space (8T). FIG. 2(A) shows a state where the mark amplitude and the space amplitude are generally equal to each other with respect to the reference level. From expression (1) above, β is calculated as 0. FIG. 2(B) shows a waveform obtained when reproduction is performed from an area in which recording has been performed at a lower recording power than in the case of (A). In this case, the mark amplitude is larger than the space amplitude with respect to the reference level. From expression (1) above, β having a negative sign is calculated. FIG. 2(C) shows a waveform obtained when reproduction is performed from an area in which recording has been performed at a higher recording power than in the case of (A). In this case, the mark amplitude is smaller than the space amplitude with respect to the reference level. From expression (1) above, β having a positive sign is calculated. As can be seen, the β index is correlated with the recording quality when reproduction is performed from an area in which recording has been performed with the recording power being changed. Therefore, the β index is conventionally used as a target value of recording power adjustment. A recording power adjustment method using the β index value is described in, for example, Japanese Laid-Open Patent Publication No. 9-161272.

The β index value is an evaluation index used for measuring the amplitude ratio of the longest mark and the longest space based on the center of the total energy of the reproduction waveform, and therefore is not influenced by the amplitude deterioration of the shortest mark which is caused by the increase of the recording density mentioned above. Here, the amplitude of the mark means the amplitude of a reproduction signal obtained when the mark is reproduced, and the amplitude of the space means the amplitude of a reproduction signal obtained when the space is reproduced.

In the processing of reproducing a recorded signal, unless the center of the amplitude of the shortest mark is within a prescribed range in the entire amplitude of the longest mark/space (8T), the recorded digital signal cannot be demodulated and thus the compatibility of the optical disc apparatus cannot be stably maintained in some cases. The reason is that especially a system for which the recording quality is defined by jitter index needs to be in a recording state or a reproduction state in which a 2T amplitude equal to or larger than a prescribed level is obtained. For example, the BD format for the density of 25 GB defines the characteristics of the medium by a jitter value using a limit equalizer. In order to define the recording quality of 2T, the asymmetry evaluation value based on the AC amplitude of 2T needs to be within a prescribed range. The jitter measurement index using a limit equalizer is explained in Non-patent Document 1 ("Zukai Blu-ray Disc Dokuhon" (Blu-ray Handbook with Diagrams) and will not be explained here.

At a recording linear density at which the frequency of the shortest mark is around, or exceeds, the OTF cutoff frequency, the jitter measurement index using a limit equalizer cannot be used. The reason is that the jitter measurement index is usable under the condition that there is a 2T amplitude equal to or larger than a prescribed level as described above. Therefore, it is meaningless to use the asymmetry index value based on the amplitude of 2T.

A useful method for reproducing a recording mark, which is recorded at a recording density at which the frequency of the shortest mark is around, or exceeds, the OTF cutoff frequency, is a high order PRML system. For example, the PR12221ML system is usable. In consideration of the influence of inter-code interference, this system is usable on the premise that a 2T amplitude is not obtained. Therefore, the 2T amplitude is not important. However, when a waveform in which the amplitude ratio of the mark and the space is largely different from the reference ratio is reproduced by the PRML system, the reproduction performance may be significantly deteriorated. The reason is that the PRML system decodes a reproduction waveform on the premise that the mark and the space are symmetrical. It is not necessary to define the symmetry based on the 2T amplitude, but the ratio ($\beta$) of the mark and the space needs to be restricted to a prescribed range with respect to the center of energy of the entire waveform, in order to maintain the recording quality suitable to the PRML system. For example, a good recording quality of a recordable type recording medium can be maintained by restricting $\beta$ to the range of $-0.2 \leq \beta \leq 0.2$.

As described above, in an area which has a recording linear density at which the frequency of the shortest mark is sufficiently lower than the OTF cutoff frequency and thus for which the jitter evaluation index is useful, the asymmetry index value based on the 2T amplitude is used for defining the recording quality. Thus, a stable recording medium can be provided.

In an area which has a recording linear density at which the frequency of the shortest mark is around, or exceeds, the OTF cutoff frequency and thus for which the jitter evaluation index is not usable and the PR12221ML evaluation index is useful, the $\beta$ index value based on the center of energy of the entire waveform is used for defining the recording quality. Thus, a stable recording medium can be provided.

The recording quality significantly depends on the shape of the recording waveform as well as the recording power relating to the asymmetry index or the $\beta$ index value. For defining the recording quality relating to the recording waveform, the jitter index value or the PR12221ML evaluation index is usable. Since the recording quality of the information recorded on a recording medium is defined using a numerical value, a technique suitable to the recording linear density can be used to define the recording quality. As a result, the compatibility of an optical disc apparatus can be maintained stably.

Now, a concept of the tolerable range for $\beta$ for reproducing or evaluating an information recording medium using the PR12221ML system as the reproduction signal processing will be described. The following description will be made regarding, as an example, an area having a recording density at which the frequency of the shortest mark is around, or exceeds, the OTF cutoff frequency; for example, an area of the BD format. The recording linear density is 33 GB. In the above, it is explained that the asymmetry index value using the 2T amplitude is not useful in a certain recording linear density area. Here, it will be explained that for the reproduction signal processing using the PR12221ML system, it is useful to define the recording quality within a prescribed range using the $\beta$ index. It will also be explained in which range the recording quality needs to be defined in order to guarantee the recording quality.

First, reproduction signal processing of PR12221ML will be described.

In a specific optical disc apparatus, a PR12221ML system is adopted for signal processing of a reproduction system, and a Run Length Limited code such as an RLL(1, 7) code is used as a recording code. First, with reference to FIG. 3 and FIG. 4, PR12221ML will be described briefly.

Figure 3:
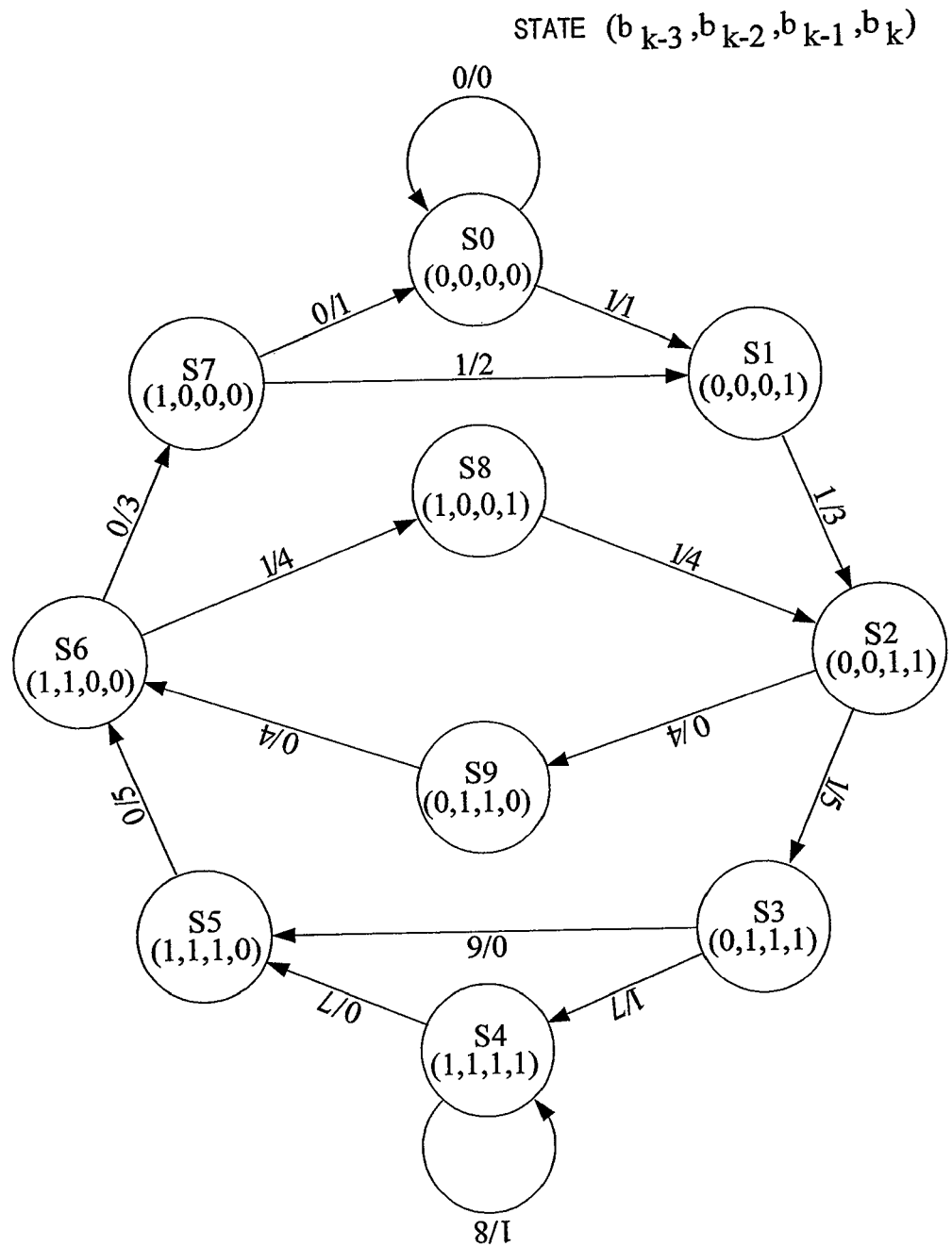
FIG. 3 shows a state transition rule defined by the RLL(1, 7) recording code and the equalization system PR(1, 2, 2, 2, 1) according to an embodiment of the present invention.

By the combination of PR12221ML and RLL(1, 7), the number of states in a decoding section is limited to 10, the number of state transition paths is 16, and the number of reproduction levels is 9. FIG. 3 is a state transition diagram of PRML, which shows a PR12221ML state transition rule. Ten states at a certain time are represented as follows. State S(0, 0, 0, 0) is represented as S0, state S(0, 0, 0, 1) is represented as S1, state S(0, 0, 1, 1) is represented as S2, state S(0, 1, 1, 1) is represented as S3, state S(1, 1, 1, 1) is represented as S4, state S(1, 1, 1, 0) is represented as S5, state S(1, 1, 0, 0) is represented as S6, state S(1, 0, 0, 0) is represented as S7, state S(1, 0, 0, 1) is represented as S8, and state S(0, 1, 1, 0) is represented as S9. "0" or "1" in parentheses represents a signal stream on the time axis, and represents which state will possibly occur at the next time by a state transition from each state. The trellis diagram shown in FIG. 4 is obtained by developing this state transition diagram along the time axis.

Figure 4:
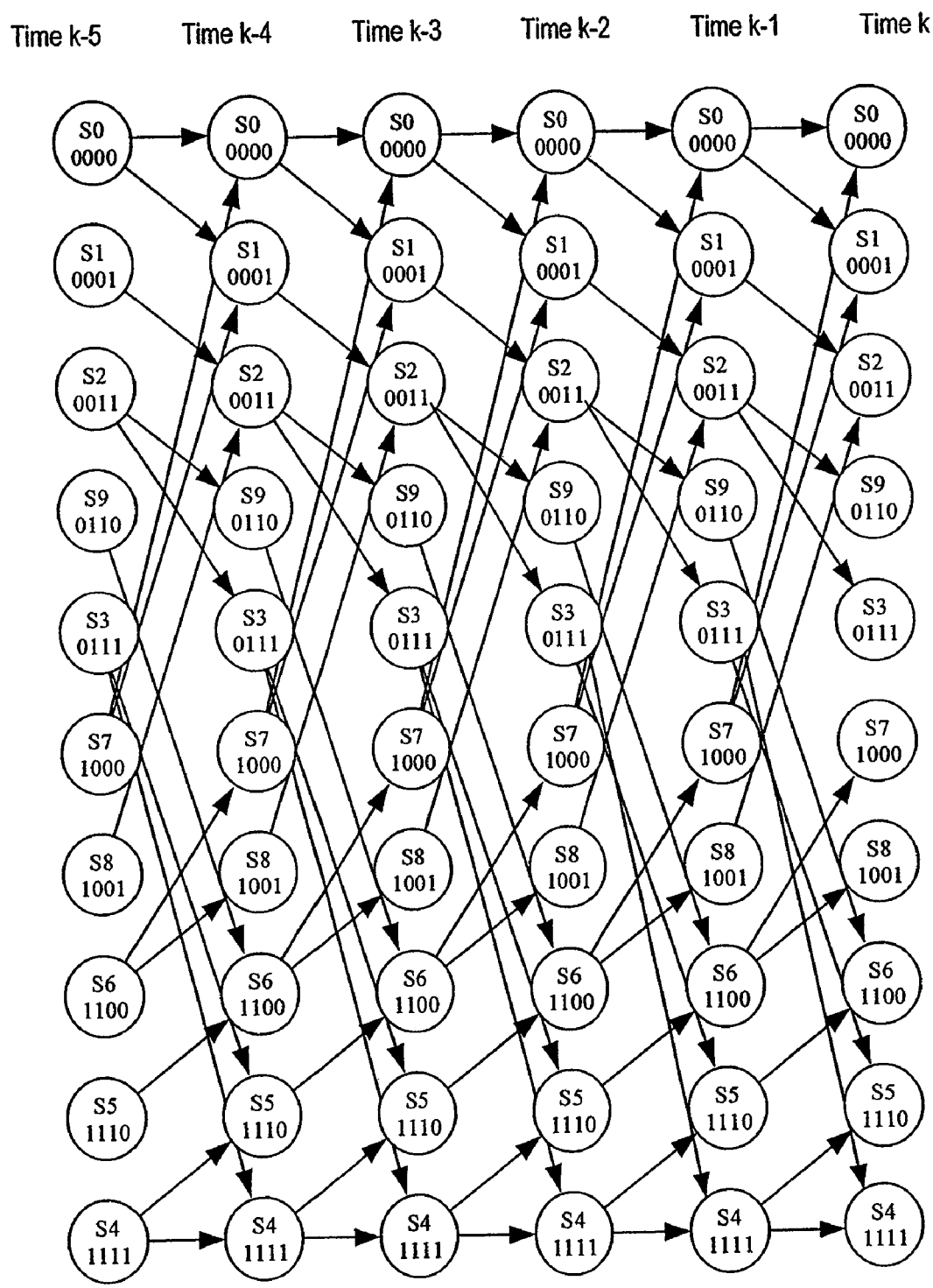
FIG. 4 is a trellis diagram corresponding to the state transition rule shown in FIG. 3.

In the state transition of PR12221ML shown in FIG. 4, there are numerous state transition patterns (state combinations) by which a prescribed state at one time is changed to another prescribed state at the next time via either one of two state transitions. Focusing on such patterns which are especially likely to cause an error within a certain time range, the state transition patterns of PR12221ML can be summarized as Tables 1, 2 and 3.

TABLE 1

| state transition | recording code $(b_{k-i}, \ldots, b_k)$ | k − 9 | k − 8 | k − 7 | k − 6 | k − 5 | k − 4 | k − 3 | k − 2 | k − 1 | k | PR equalization ideal value | | | | Euclidean distance between paths |
|---|---|---|---|---|---|---|---|---|---|---|---|---|---|---|---|---|
| $S0_{k-5} \to S6_k$ | (0, 0, 0, 0, 1, 1, 1, 0, 0) | | | | | S0 | S1 | S2 | S3 | S5 | S6 | 1 | 3 | 5 | 6 | 5 |
| | (0, 0, 0, 0, 0, 1, 1, 0, 0) | | | | | S0 | S0 | S1 | S2 | S9 | S6 | 0 | 1 | 3 | 4 | 4 | 14 |
| $S0_{k-5} \to S5_k$ | (0, 0, 0, 0, 1, 1, 1, 1, 0) | | | | | S0 | S1 | S2 | S3 | S4 | S5 | 1 | 3 | 5 | 7 | 8 |
| | (0, 0, 0, 0, 0, 1, 1, 1, 0) | | | | | S0 | S0 | S1 | S2 | S3 | S5 | 0 | 1 | 3 | 5 | 7 | 14 |
| $S0_{k-5} \to S4_k$ | (0, 0, 0, 0, 1, 1, 1, 1, 1) | | | | | S0 | S1 | S2 | S3 | S4 | S4 | 1 | 3 | 5 | 7 | 8 |
| | (0, 0, 0, 0, 0, 1, 1, 1, 1) | | | | | S0 | S0 | S1 | S2 | S3 | S4 | 0 | 1 | 3 | 5 | 7 | 14 |

TABLE 1-continued

| state transition | recording code $(b_{k-i}, \ldots, b_k)$ | k − 9 | k − 8 | k − 7 | k − 6 | k − 5 | k − 4 | k − 3 | k − 2 | k − 1 | k | PR equalization ideal value | | | | | Euclidean distance between paths |
|---|---|---|---|---|---|---|---|---|---|---|---|---|---|---|---|---|---|
| $S2_{k-5} \to S0_k$ | (0, 0, 1, 1, 1, 0, 0, 0, 0) | | | | | S2 | S3 | S5 | S6 | S7 | S0 | 5 | 6 | 5 | 3 | 1 | |
| | (0, 0, 1, 1, 0, 0, 0, 0, 0) | | | | | S2 | S9 | S6 | S7 | S0 | S0 | 4 | 4 | 3 | 1 | 0 | 14 |
| $S2_{k-5} \to S1_k$ | (0, 0, 1, 1, 1, 0, 0, 0, 1) | | | | | S2 | S3 | S5 | S6 | S7 | S1 | 5 | 6 | 5 | 3 | 2 | |
| | (0, 0, 1, 1, 0, 0, 0, 0, 1) | | | | | S2 | S9 | S6 | S7 | S0 | S1 | 4 | 4 | 3 | 1 | 1 | 14 |
| $S2_{k-5} \to S2_k$ | (0, 0, 1, 1, 1, 0, 0, 1, 1) | | | | | S2 | S3 | S5 | S6 | S8 | S2 | 5 | 6 | 5 | 4 | 4 | |
| | (0, 0, 1, 1, 0, 0, 0, 1, 1) | | | | | S2 | S9 | S6 | S7 | S1 | S2 | 4 | 4 | 3 | 2 | 3 | 14 |
| $S3_{k-5} \to S0_k$ | (0, 1, 1, 1, 1, 0, 0, 0, 0) | | | | | S3 | S4 | S5 | S6 | S7 | S0 | 7 | 7 | 5 | 3 | 1 | |
| | (0, 1, 1, 1, 0, 0, 0, 0, 0) | | | | | S3 | S5 | S6 | S7 | S0 | S0 | 6 | 5 | 3 | 1 | 0 | 14 |
| $S3_{k-5} \to S1_k$ | (0, 1, 1, 1, 1, 0, 0, 0, 1) | | | | | S3 | S4 | S5 | S6 | S7 | S1 | 7 | 7 | 5 | 3 | 2 | |
| | (0, 1, 1, 1, 0, 0, 0, 0, 1) | | | | | S3 | S5 | S6 | S7 | S0 | S1 | 6 | 5 | 3 | 1 | 1 | 14 |
| $S3_{k-5} \to S2_k$ | (0, 1, 1, 1, 1, 0, 0, 1, 1) | | | | | S3 | S4 | S5 | S6 | S8 | S2 | 7 | 7 | 5 | 4 | 4 | |
| | (0, 1, 1, 1, 0, 0, 0, 1, 1) | | | | | S3 | S5 | S6 | S7 | S1 | S2 | 6 | 5 | 3 | 2 | 3 | 14 |
| $S7_{k-5} \to S6_k$ | (1, 0, 0, 0, 1, 1, 1, 0, 0) | | | | | S7 | S1 | S2 | S3 | S5 | S6 | 2 | 3 | 5 | 6 | 5 | |
| | (1, 0, 0, 0, 0, 1, 1, 0, 0) | | | | | S7 | S0 | S1 | S2 | S9 | S6 | 1 | 1 | 3 | 4 | 4 | 14 |
| $S7_{k-5} \to S5_k$ | (1, 0, 0, 0, 1, 1, 1, 1, 0) | | | | | S7 | S1 | S2 | S3 | S4 | S5 | 2 | 3 | 5 | 7 | 7 | |
| | (1, 0, 0, 0, 0, 1, 1, 1, 0) | | | | | S7 | S0 | S1 | S2 | S3 | S5 | 1 | 1 | 3 | 5 | 6 | 14 |
| $S7_{k-5} \to S4_k$ | (1, 0, 0, 0, 1, 1, 1, 1, 1) | | | | | S7 | S1 | S2 | S3 | S4 | S4 | 2 | 3 | 5 | 7 | 8 | |
| | (1, 0, 0, 0, 0, 1, 1, 1, 1) | | | | | S7 | S0 | S1 | S2 | S3 | S4 | 1 | 1 | 3 | 5 | 7 | 14 |
| $S6_{k-5} \to S6_k$ | (1, 1, 0, 0, 1, 1, 1, 0, 0) | | | | | S6 | S8 | S2 | S3 | S5 | S6 | 4 | 4 | 5 | 6 | 5 | |
| | (1, 1, 0, 0, 0, 1, 1, 0, 0) | | | | | S6 | S7 | S1 | S2 | S9 | S6 | 3 | 2 | 3 | 4 | 4 | 14 |
| $S6_{k-5} \to S5_k$ | (1, 1, 0, 0, 1, 1, 1, 1, 0) | | | | | S6 | S8 | S2 | S3 | S4 | S5 | 4 | 4 | 5 | 7 | 7 | |
| | (1, 1, 0, 0, 0, 1, 1, 1, 0) | | | | | S6 | S7 | S1 | S2 | S3 | S5 | 3 | 2 | 3 | 5 | 6 | 14 |
| $S6_{k-5} \to S4_k$ | (1, 1, 0, 0, 1, 1, 1, 1, 1) | | | | | S6 | S8 | S2 | S3 | S4 | S4 | 4 | 4 | 5 | 7 | 8 | |
| | (1, 1, 0, 0, 0, 1, 1, 1, 1) | | | | | S6 | S7 | S1 | S2 | S3 | S4 | 3 | 2 | 3 | 5 | 7 | 14 |
| $S4_{k-5} \to S0_k$ | (1, 1, 1, 1, 1, 0, 0, 0, 0) | | | | | S4 | S4 | S5 | S6 | S7 | S0 | 8 | 7 | 5 | 3 | 1 | |
| | (1, 1, 1, 1, 0, 0, 0, 0, 0) | | | | | S4 | S5 | S6 | S7 | S0 | S0 | 7 | 5 | 3 | 1 | 0 | 14 |
| $S4_{k-5} \to S1_k$ | (1, 1, 1, 1, 1, 0, 0, 0, 1) | | | | | S4 | S4 | S5 | S6 | S7 | S1 | 8 | 7 | 5 | 3 | 2 | |
| | (1, 1, 1, 1, 0, 0, 0, 0, 1) | | | | | S4 | S5 | S6 | S7 | S0 | S1 | 7 | 5 | 3 | 1 | 1 | 14 |
| $S4_{k-5} \to S2_k$ | (1, 1, 1, 1, 1, 0, 0, 1, 1) | | | | | S4 | S4 | S5 | S6 | S8 | S2 | 8 | 7 | 5 | 4 | 4 | |
| | (1, 1, 1, 1, 0, 0, 0, 1, 1) | | | | | S4 | S5 | S6 | S7 | S1 | S2 | 7 | 5 | 3 | 2 | 3 | 14 |

TABLE 2

| state transition | recording code $(b_{k-i}, \ldots, b_k)$ | k − 9 | k − 8 | k − 7 | k − 6 | k − 5 | k − 4 | k − 3 | k − 2 | k − 1 | k | PR equalization ideal value | | | | | | | Euclidean distance between paths |
|---|---|---|---|---|---|---|---|---|---|---|---|---|---|---|---|---|---|---|---|
| $S0_{k-7} \to S0_k$ | (0, 0, 0, 0, 1, 1, 0, 0, 0, 0) | | | S0 | S1 | S2 | S9 | S6 | S7 | S0 | S0 | 1 | 3 | 4 | 4 | 3 | 1 | 0 | |
| | (0, 0, 0, 0, 0, 1, 1, 0, 0, 0) | | | S0 | S0 | S1 | S2 | S9 | S6 | S7 | S0 | 0 | 1 | 3 | 4 | 4 | 3 | 1 | 12 |
| $S0_{k-7} \to S1_k$ | (0, 0, 0, 0, 1, 1, 0, 0, 0, 1) | | | S0 | S1 | S2 | S9 | S6 | S7 | S0 | S1 | 1 | 3 | 4 | 4 | 3 | 1 | 1 | |
| | (0, 0, 0, 0, 0, 1, 1, 0, 0, 1) | | | S0 | S0 | S1 | S2 | S9 | S6 | S7 | S1 | 0 | 1 | 3 | 4 | 4 | 3 | 2 | 12 |
| $S0_{k-7} \to S2_k$ | (0, 0, 0, 0, 1, 1, 0, 0, 1, 1) | | | S0 | S1 | S2 | S9 | S6 | S7 | S1 | S2 | 1 | 3 | 4 | 4 | 3 | 2 | 3 | |
| | (0, 0, 0, 0, 0, 1, 1, 0, 1, 1) | | | S0 | S0 | S1 | S2 | S9 | S6 | S8 | S2 | 0 | 1 | 3 | 4 | 4 | 4 | 4 | 12 |
| $S2_{k-7} \to S6_k$ | (0, 0, 1, 1, 1, 0, 0, 1, 1, 0, 0) | | | S2 | S3 | S5 | S6 | S8 | S2 | S9 | S6 | 5 | 6 | 5 | 4 | 4 | 4 | 4 | |
| | (0, 0, 1, 1, 0, 0, 1, 1, 1, 0, 0) | | | S2 | S9 | S6 | S8 | S2 | S3 | S5 | S6 | 4 | 4 | 4 | 4 | 5 | 6 | 5 | 12 |
| $S2_{k-7} \to S5_k$ | (0, 0, 1, 1, 1, 0, 0, 1, 1, 1, 0) | | | S2 | S3 | S5 | S6 | S8 | S2 | S3 | S5 | 5 | 6 | 5 | 4 | 4 | 5 | 6 | |
| | (0, 0, 1, 1, 0, 0, 1, 1, 1, 1, 0) | | | S2 | S9 | S6 | S8 | S2 | S3 | S4 | S5 | 4 | 4 | 4 | 4 | 5 | 7 | 7 | 12 |
| $S2_{k-7} \to S4_k$ | (0, 0, 1, 1, 1, 0, 0, 1, 1, 1, 1) | | | S2 | S3 | S5 | S6 | S8 | S2 | S3 | S4 | 5 | 6 | 5 | 4 | 4 | 5 | 7 | |
| | (0, 0, 1, 1, 0, 0, 1, 1, 1, 1, 1) | | | S2 | S9 | S6 | S8 | S2 | S3 | S4 | S4 | 4 | 4 | 4 | 4 | 5 | 7 | 8 | 12 |
| $S3_{k-7} \to S6_k$ | (0, 1, 1, 1, 1, 0, 0, 1, 1, 0, 0) | | | S3 | S4 | S5 | S6 | S8 | S2 | S9 | S6 | 7 | 7 | 5 | 4 | 4 | 4 | 4 | |
| | (0, 1, 1, 1, 0, 0, 1, 1, 1, 0, 0) | | | S3 | S5 | S6 | S8 | S2 | S3 | S5 | S6 | 6 | 5 | 4 | 4 | 5 | 6 | 5 | 12 |
| $S3_{k-7} \to S5_k$ | (0, 1, 1, 1, 1, 0, 0, 1, 1, 1, 0) | | | S3 | S4 | S5 | S6 | S8 | S2 | S3 | S5 | 7 | 7 | 5 | 4 | 4 | 5 | 6 | |
| | (0, 1, 1, 1, 0, 0, 1, 1, 1, 1, 0) | | | S3 | S5 | S6 | S8 | S2 | S3 | S4 | S5 | 6 | 5 | 4 | 4 | 5 | 7 | 7 | 12 |
| $S3_{k-7} \to S4_k$ | (0, 1, 1, 1, 1, 0, 0, 1, 1, 1, 1) | | | S3 | S4 | S5 | S6 | S8 | S2 | S3 | S4 | 7 | 7 | 5 | 4 | 4 | 5 | 7 | |
| | (0, 1, 1, 1, 0, 0, 1, 1, 1, 1, 1) | | | S3 | S5 | S6 | S8 | S2 | S3 | S4 | S4 | 6 | 5 | 4 | 4 | 5 | 7 | 8 | 12 |
| $S7_{k-7} \to S0_k$ | (1, 0, 0, 0, 1, 1, 0, 0, 0, 0) | | | S7 | S1 | S2 | S9 | S6 | S7 | S0 | S0 | 2 | 3 | 4 | 4 | 3 | 1 | 0 | |
| | (1, 0, 0, 0, 0, 1, 1, 0, 0, 0) | | | S7 | S0 | S1 | S2 | S9 | S6 | S7 | S0 | 1 | 1 | 3 | 4 | 4 | 3 | 1 | 12 |
| $S7_{k-7} \to S1_k$ | (1, 0, 0, 0, 1, 1, 0, 0, 0, 1) | | | S7 | S1 | S2 | S9 | S6 | S7 | S0 | S1 | 2 | 3 | 4 | 4 | 3 | 1 | 1 | |
| | (1, 0, 0, 0, 0, 1, 1, 0, 0, 1) | | | S7 | S0 | S1 | S2 | S9 | S6 | S7 | S1 | 1 | 1 | 3 | 4 | 4 | 3 | 2 | 12 |
| $S7_{k-7} \to S2_k$ | (1, 0, 0, 0, 1, 1, 0, 0, 1, 1) | | | S7 | S1 | S2 | S9 | S6 | S7 | S1 | S2 | 2 | 3 | 4 | 4 | 3 | 2 | 3 | |
| | (1, 0, 0, 0, 0, 1, 1, 0, 1, 1) | | | S7 | S0 | S1 | S2 | S9 | S6 | S8 | S2 | 1 | 1 | 3 | 4 | 4 | 4 | 4 | 12 |
| $S6_{k-7} \to S0_k$ | (1, 1, 0, 0, 1, 1, 0, 0, 0, 0) | | | S6 | S8 | S2 | S9 | S6 | S7 | S0 | S0 | 4 | 4 | 4 | 4 | 3 | 1 | 0 | |
| | (1, 1, 0, 0, 0, 1, 1, 0, 0, 0) | | | S6 | S7 | S1 | S2 | S9 | S6 | S7 | S0 | 3 | 2 | 3 | 4 | 4 | 3 | 1 | 12 |
| $S6_{k-7} \to S1_k$ | (1, 1, 0, 0, 1, 1, 0, 0, 0, 1) | | | S6 | S8 | S2 | S9 | S6 | S7 | S0 | S1 | 4 | 4 | 4 | 4 | 3 | 1 | 1 | |
| | (1, 1, 0, 0, 0, 1, 1, 0, 0, 1) | | | S6 | S7 | S1 | S2 | S9 | S6 | S7 | S1 | 3 | 2 | 3 | 4 | 4 | 3 | 2 | 12 |
| $S6_{k-7} \to S2_k$ | (1, 1, 0, 0, 1, 1, 0, 0, 1, 1) | | | S6 | S8 | S2 | S9 | S6 | S7 | S1 | S2 | 4 | 4 | 4 | 4 | 3 | 2 | 3 | |
| | (1, 1, 0, 0, 0, 1, 1, 0, 1, 1) | | | S6 | S7 | S1 | S2 | S9 | S6 | S8 | S2 | 3 | 2 | 3 | 4 | 4 | 4 | 4 | 12 |
| $S4_{k-7} \to S6_k$ | (1, 1, 1, 1, 0, 0, 1, 1, 0, 0) | | | S4 | S4 | S5 | S6 | S8 | S2 | S9 | S6 | 8 | 7 | 5 | 4 | 4 | 4 | 4 | |
| | (1, 1, 1, 1, 0, 0, 1, 1, 0, 0) | | | S4 | S5 | S6 | S8 | S2 | S3 | S5 | S6 | 7 | 5 | 4 | 4 | 5 | 6 | 5 | 12 |
| $S4_{k-7} \to S5_k$ | (1, 1, 1, 1, 0, 0, 1, 1, 1, 0) | | | S4 | S4 | S5 | S6 | S8 | S2 | S3 | S5 | 8 | 7 | 5 | 4 | 4 | 5 | 6 | |
| | (1, 1, 1, 1, 0, 0, 1, 1, 1, 0) | | | S4 | S5 | S6 | S8 | S2 | S3 | S4 | S5 | 7 | 5 | 4 | 4 | 5 | 7 | 7 | |

TABLE 2-continued

| state transition | recording code $(b_{k-i}, \ldots, b_k)$ | k−9 | k−8 | k−7 | k−6 | k−5 | k−4 | k−3 | k−2 | k−1 | k | PR equalization ideal value | Euclidean distance between paths |
|---|---|---|---|---|---|---|---|---|---|---|---|---|---|
| $S4_{k-7} \to S4_k$ | (1, 1, 1, 1, 1, 0, 0, 1, 1, 1) | | | S4 | S4 | S5 | S6 | S8 | S2 | S3 | S4 | 8 7 5 4 4 5 7 | |
| | (1, 1, 1, 1, 0, 0, 1, 1, 1, 1) | | | S4 | S5 | S6 | S8 | S2 | S3 | S4 | S4 | 7 5 4 4 5 7 8 | 12 |

TABLE 3

| state transition | recording code $(b_{k-i}, \ldots, b_k)$ | k−9 | k−8 | k−7 | k−6 | k−5 | k−4 | k−3 | k−2 | k−1 | k | PR equalization ideal value | Euclidean distance between paths |
|---|---|---|---|---|---|---|---|---|---|---|---|---|---|
| $S0_{k-9} \to S6_k$ | (0, 0, 0, 0, 1, 1, 0, 0, 1, 1, 1, 0, 0) | S0 | S1 | S2 | S9 | S6 | S8 | S2 | S3 | S5 | S6 | 1 3 4 4 4 4 5 6 5 | |
| | (0, 0, 0, 0, 0, 1, 1, 0, 0, 1, 1, 0, 0) | S0 | S0 | S1 | S2 | S9 | S6 | S8 | S2 | S9 | S6 | 0 1 3 4 4 4 4 4 4 | 12 |
| $S0_{k-9} \to S5_k$ | (0, 0, 0, 0, 1, 1, 0, 0, 1, 1, 1, 0, 1) | S0 | S1 | S2 | S9 | S6 | S8 | S2 | S3 | S4 | S5 | 1 3 4 4 4 4 5 7 7 | |
| | (0, 0, 0, 0, 0, 1, 1, 0, 0, 1, 1, 0, 1) | S0 | S0 | S1 | S2 | S9 | S6 | S8 | S2 | S3 | S5 | 0 1 3 4 4 4 4 5 6 | 12 |
| $S0_{k-9} \to S4_k$ | (0, 0, 0, 0, 1, 1, 0, 0, 1, 1, 1, 1, 1) | S0 | S1 | S2 | S9 | S6 | S8 | S2 | S3 | S4 | S4 | 1 3 4 4 4 4 5 7 8 | |
| | (0, 0, 0, 0, 0, 1, 1, 0, 0, 1, 1, 1, 1) | S0 | S0 | S1 | S2 | S9 | S6 | S8 | S2 | S3 | S4 | 0 1 3 4 4 4 4 5 7 | 12 |
| $S2_{k-7} \to S0_k$ | (0, 0, 1, 1, 1, 0, 0, 1, 1, 0, 0, 0, 0) | S2 | S3 | S5 | S6 | S8 | S2 | S9 | S6 | S7 | S0 | 5 6 5 4 4 4 4 3 1 | |
| | (0, 0, 1, 1, 0, 0, 1, 1, 0, 0, 0, 0, 0) | S2 | S9 | S6 | S8 | S2 | S9 | S6 | S7 | S0 | S0 | 4 4 4 4 4 4 3 1 0 | 12 |
| $S2_{k-7} \to S1_k$ | (0, 0, 1, 1, 1, 0, 0, 1, 1, 0, 0, 0, 1) | S2 | S3 | S5 | S6 | S8 | S2 | S9 | S6 | S7 | S1 | 5 6 5 4 4 4 4 3 2 | |
| | (0, 0, 1, 1, 0, 0, 1, 1, 0, 0, 0, 0, 1) | S2 | S9 | S6 | S8 | S2 | S9 | S6 | S7 | S0 | S1 | 4 4 4 4 4 4 3 1 1 | 12 |
| $S2_{k-7} \to S2_k$ | (0, 0, 1, 1, 1, 0, 0, 1, 1, 0, 0, 1, 1) | S2 | S3 | S5 | S6 | S8 | S2 | S9 | S6 | S8 | S2 | 5 6 5 4 4 4 4 4 4 | |
| | (0, 0, 1, 1, 0, 0, 1, 1, 0, 0, 0, 1, 1) | S2 | S9 | S6 | S8 | S2 | S9 | S6 | S7 | S1 | S2 | 4 4 4 4 4 4 3 2 3 | 12 |
| $S3_{k-5} \to S0_k$ | (0, 1, 1, 1, 1, 0, 0, 1, 1, 0, 0, 0, 0) | S3 | S4 | S5 | S6 | S8 | S2 | S9 | S6 | S7 | S0 | 7 7 5 4 4 4 4 3 1 | |
| | (0, 1, 1, 1, 0, 0, 1, 1, 0, 0, 0, 0, 0) | S3 | S5 | S6 | S8 | S2 | S9 | S6 | S7 | S0 | S0 | 6 5 4 4 4 4 3 1 0 | 12 |
| $S3_{k-5} \to S1_k$ | (0, 1, 1, 1, 1, 0, 0, 1, 1, 0, 0, 0, 1) | S3 | S4 | S5 | S6 | S8 | S2 | S9 | S6 | S7 | S1 | 7 7 5 4 4 4 4 3 2 | |
| | (0, 1, 1, 1, 0, 0, 1, 1, 0, 0, 0, 0, 1) | S3 | S5 | S6 | S8 | S2 | S9 | S6 | S7 | S0 | S1 | 6 5 4 4 4 4 3 1 1 | 12 |
| $S3_{k-5} \to S2_k$ | (0, 1, 1, 1, 1, 0, 0, 1, 1, 0, 0, 1, 1) | S3 | S4 | S5 | S6 | S8 | S2 | S9 | S6 | S8 | S2 | 7 7 5 4 4 4 4 4 4 | |
| | (0, 1, 1, 1, 0, 0, 1, 1, 0, 0, 0, 1, 1) | S3 | S5 | S6 | S8 | S2 | S9 | S6 | S7 | S1 | S2 | 6 5 4 4 4 4 3 2 3 | 12 |
| $S3_{k-5} \to S2_k$ | (1, 0, 0, 0, 1, 1, 0, 0, 1, 1, 1, 0, 0) | S7 | S1 | S2 | S9 | S6 | S8 | S2 | S3 | S5 | S6 | 2 3 4 4 4 4 5 6 5 | |
| | (1, 0, 0, 0, 0, 1, 1, 0, 0, 1, 1, 0, 0) | S7 | S0 | S1 | S2 | S9 | S6 | S8 | S2 | S9 | S6 | 1 1 3 4 4 4 4 4 4 | 12 |
| $S3_{k-5} \to S2_k$ | (1, 0, 0, 0, 1, 1, 0, 0, 1, 1, 1, 1, 0) | S7 | S1 | S2 | S9 | S6 | S8 | S2 | S3 | S4 | S5 | 2 3 4 4 4 4 5 7 7 | |
| | (1, 0, 0, 0, 0, 1, 1, 0, 0, 1, 1, 1, 0) | S7 | S0 | S1 | S2 | S9 | S6 | S8 | S2 | S3 | S5 | 1 1 3 4 4 4 4 5 6 | 12 |
| $S3_{k-5} \to S2_k$ | (1, 0, 0, 0, 1, 1, 0, 0, 1, 1, 1, 1, 1) | S7 | S1 | S2 | S9 | S6 | S8 | S2 | S3 | S4 | S4 | 2 3 4 4 4 4 5 7 8 | |
| | (1, 0, 0, 0, 0, 1, 1, 0, 0, 1, 1, 1, 1) | S7 | S0 | S1 | S2 | S9 | S6 | S8 | S2 | S3 | S4 | 1 1 3 4 4 4 4 5 7 | 12 |
| $S6_{k-5} \to S6_k$ | (1, 1, 0, 0, 1, 1, 0, 0, 1, 1, 1, 0, 0) | S6 | S8 | S2 | S9 | S6 | S8 | S2 | S3 | S5 | S6 | 4 4 4 4 4 4 5 6 5 | |
| | (1, 1, 0, 0, 0, 1, 1, 0, 0, 1, 1, 0, 0) | S6 | S7 | S1 | S2 | S9 | S6 | S8 | S2 | S9 | S6 | 3 2 3 4 4 4 4 4 4 | 12 |
| $S6_{k-5} \to S5_k$ | (1, 1, 0, 0, 1, 1, 0, 0, 1, 1, 1, 1, 0) | S6 | S8 | S2 | S9 | S6 | S8 | S2 | S3 | S4 | S5 | 4 4 4 4 4 4 5 7 7 | |
| | (1, 1, 0, 0, 0, 1, 1, 0, 0, 1, 1, 1, 0) | S6 | S7 | S1 | S2 | S9 | S6 | S8 | S2 | S3 | S5 | 3 2 3 4 4 4 4 5 6 | 12 |
| $S6_{k-5} \to S4_k$ | (1, 1, 0, 0, 1, 1, 0, 0, 1, 1, 1, 1, 1) | S6 | S8 | S2 | S9 | S6 | S8 | S2 | S3 | S4 | S4 | 4 4 4 4 4 4 5 7 8 | |
| | (1, 1, 0, 0, 0, 1, 1, 0, 0, 1, 1, 1, 1) | S6 | S7 | S1 | S2 | S9 | S6 | S8 | S2 | S3 | S4 | 3 2 3 4 4 4 4 5 7 | 12 |
| $S4_{k-5} \to S0_k$ | (1, 1, 1, 1, 0, 0, 1, 1, 0, 0, 0, 0) | S4 | S4 | S5 | S6 | S8 | S2 | S9 | S6 | S7 | S0 | 8 7 5 4 4 4 4 3 1 | |
| | (1, 1, 1, 1, 0, 0, 1, 1, 0, 0, 0, 0, 0) | S4 | S5 | S6 | S8 | S2 | S9 | S6 | S7 | S0 | S0 | 7 5 4 4 4 4 3 1 0 | 12 |
| $S4_{k-5} \to S1_k$ | (1, 1, 1, 1, 0, 0, 1, 1, 0, 0, 0, 0, 1) | S4 | S4 | S5 | S6 | S8 | S2 | S9 | S6 | S7 | S1 | 8 7 5 4 4 4 4 3 2 | |
| | (1, 1, 1, 1, 0, 0, 1, 1, 0, 0, 0, 0, 1) | S4 | S5 | S6 | S8 | S2 | S9 | S6 | S7 | S0 | S1 | 7 5 4 4 4 4 3 1 1 | 12 |
| $S4_{k-5} \to S2_k$ | (1, 1, 1, 1, 0, 0, 1, 1, 0, 0, 1, 1) | S4 | S4 | S5 | S6 | S8 | S2 | S9 | S6 | S8 | S2 | 8 7 5 4 4 4 4 4 4 | |
| | (1, 1, 1, 1, 0, 0, 1, 1, 0, 0, 0, 1, 1) | S4 | S5 | S6 | S8 | S2 | S9 | S6 | S7 | S1 | S2 | 7 5 4 4 4 4 3 2 3 | 12 |

Each table shows state transitions representing loci of states joining together from the start state, two recording streams which possibly passed through each state transition, two ideal reproduction waveforms which possibly passed through each state transition, and the Euclidean distance between the two ideal reproduction waveforms. The Euclidean distance shows a sum of squares of the difference between two ideal reproduction waveforms. For making a determination on the possibility of the two waveforms, when this value is larger, the two waveforms are more easily distinguished from each other and the possibility of a wrong determination is decreased. By contrast, when this value is smaller, it is more difficult to distinguish the two waveforms and the possibility of a wrong determination is increased. Namely, a pattern with a larger Euclidean distance is considered not to be likely to cause an error, whereas a pattern with a smaller Euclidean distance is considered to be likely to cause an error.

Figure 5:
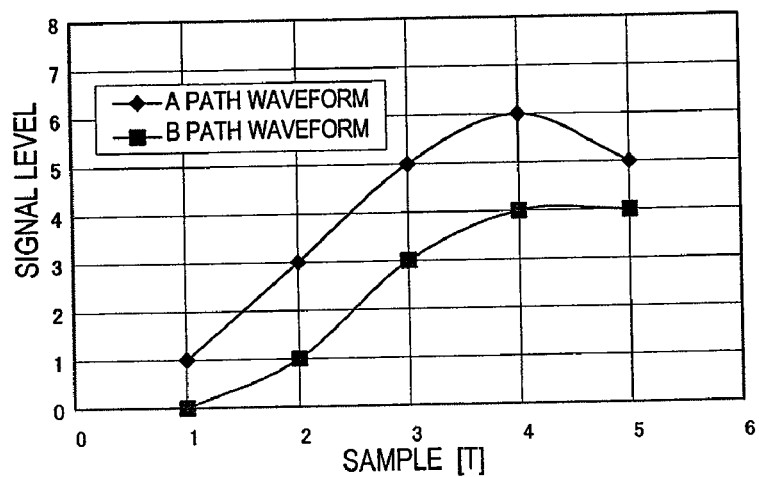
FIG. 5 shows PR equalization ideal waveforms shown in Table 1 according to an embodiment of the present invention.
Figure 6:
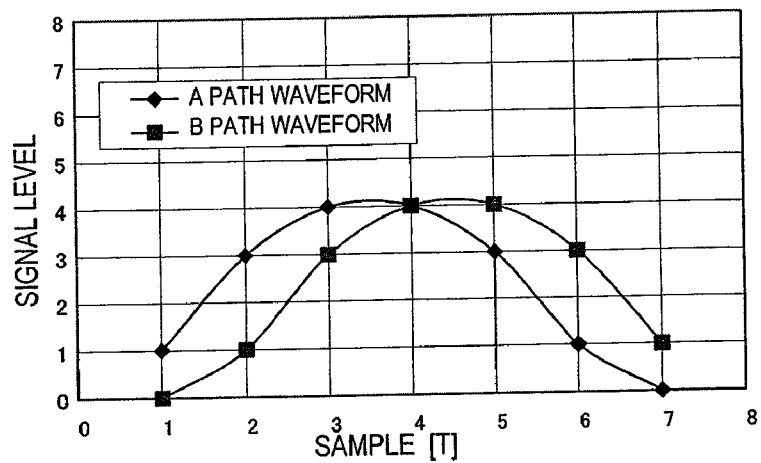
FIG. 6 is PR equalization ideal waveforms shown in Table 2 according to an embodiment of the present invention.
Figure 7:
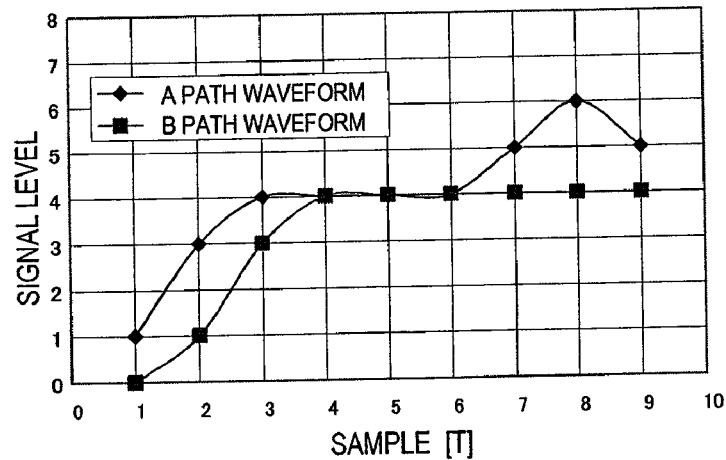
FIG. 7 is PR equalization ideal waveforms shown in Table 3 according to an embodiment of the present invention.

Table 1 shows 18 patterns by which the Euclidean distance between the two possible state transitions is 14. These patterns correspond to an edge of a waveform of an optical disc medium (a portion at which a mark is switched to a space). In other words, these patterns are 1-bit edge shift error patterns. As an example, state transition paths from S0(k−5) to S6(k) in the state transition rule in FIG. 4 will be described. In this case, in one path, a recording stream changed as "0, 0, 0, 0, 1, 1, 1, 0, 0" is detected. Considering that "0" of the reproduction data is a space and "1" of the reproduction data is a mark as in the recording state, this state transition path corresponds to a 4T or longer space, a 3T mark, and a 2T or longer space. This is shown as A path waveform in FIG. 5. In FIGS. 5 through 7, the horizontal axis represents the sampling time, which is each time unit of the recording stream, and the vertical axis represents the reproduction level. As described above, in the case of PR12221ML, there are 9 ideal reproduction levels from level 0 to level 8. In the other path, a recording stream changed as "0, 0, 0, 0, 0, 1, 1, 0, 0" is detected. Considering that "0" of the reproduction data is a space and "1" of the reproduction data is a mark as in the recording state, this state transition path corresponds to a 5T or longer space, a 2T mark, and a 2T or longer space. This is shown as B path waveform in FIG. 5. The patterns shown in Table 1 by which the Euclidean distance between the two possible state transitions is 14 have a feature of necessarily including one piece of edge information (zero-cross point).

Table 2 shows 18 patterns by which the Euclidean distance between the two possible state transitions is 12. These patterns correspond to a shift error of a 2T mark or a 2T space; namely, are 2-bit shift error patterns. As an example, state transition paths from $S0(k-7)$ to $S0(k)$ in the state transition rule in FIG. 4 will be described. Note that FIG. 4 shows the paths only up to k–5. In this case, in one path, the recording stream changed as "0, 0, 0, 0, 1, 1, 0, 0, 0, 0, 0" is detected. Considering that "0" of the reproduction data is a space and "1" of the reproduction data is a mark as in the recording state, this state transition path corresponds to a 4T or longer space, a 2T mark, and a 5T or longer space. This is shown as A path waveform in FIG. 6. In the other path, the recording stream changed as "0, 0, 0, 0, 0, 1, 1, 0, 0, 0, 0" is detected. Considering that "0" of the reproduction data is a space and "1" of the reproduction data is a mark as in the recording state, this state transition path corresponds to a 5T or longer space, a 2T mark, and a 4T or longer space. This is shown as B path waveform in FIG. 6. The patterns shown in Table 2 by which the Euclidean distance between the two possible state transitions is 12 have a feature of necessarily including two pieces of edge information of a 2T rise and a 2T fall.

Table 3 shows 18 patterns by which the Euclidean distance between two possible state transitions is 12. These patterns correspond to a portion at which a 2T mark is continuous to a 2T space; namely, are 3-bit error patterns. As an example, state transition paths from $S0(k-9)$ to $S6(k)$ in the state transition rule in FIG. 4 will be described. Note that FIG. 4 shows the paths only up to k–5. In this case, in one path, the recording stream changed as "0, 0, 0, 0, 1, 1, 0, 0, 1, 1, 1, 0, 0" is detected. Considering that "0" of the reproduction data is a space and "1" of the reproduction data is a mark as in the recording state, this state transition path corresponds to a 4T or longer space, a 2T mark, a 2T space, a 3T mark, and a 2T or longer space. This is shown as A path waveform in FIG. 7. In the other path, the recording stream changed as "0, 0, 0, 0, 0, 1, 1, 0, 0, 1, 1, 0, 0" is detected. Considering that "0" of the reproduction data is a space and "1" of the reproduction data is a mark as in the recording state, this state transition path corresponds to a 5T or longer space, a 2T mark, a 2T space, a 2T mark, and a 2T or longer space. This is shown as B path waveform in FIG. 7. The patterns shown in Table 3 by which the Euclidean distance is 12 have a feature of including at least three pieces of edge information.

It can be seen that for the PR12221ML system, the amplitude of the shortest mark and space (in this example, corresponding to 2T) is not necessary but the 2T DC amplitude with respect to the entire waveform is very important. Especially, the patterns shown in Tables 2 and 3 by which the Euclidean distance is 12 are involved in the reproduction of 2T, and the 2T amplitude is defined to correspond to the central position of the entire waveform. In FIG. 5 through FIG. 7, the central position of the entire waveform corresponds to a signal level of 4. Therefore, when the signal is reproduced as a waveform having a variance in the 2T DC amplitude, such a signal is likely to be incorrectly recognized as a result of demodulation performed by the PR12221ML. The magnitude of the variance in the 2T DC amplitude means the magnitude of a variance in the absolute value of the β evaluation value. Where the bit error rate at which the optical disc system can perform stable reproduction is 3E-4, the tolerable range of the amplitude ratio of the recording mark and the space, i.e., the tolerable range of the β evaluation value which is significantly related to the variance in the 2T DC amplitude is, for example, $-0.15 \leq \beta \leq 0.15$, in consideration of various types of reproduction stresses, various types of recording stresses (recording edge shift, SNR deterioration caused by a recording power change, etc.) and the like. This is merely an example, and the tolerable range varies in accordance with how to distribute the reproduction and recording margins of the system.

Figure 8:
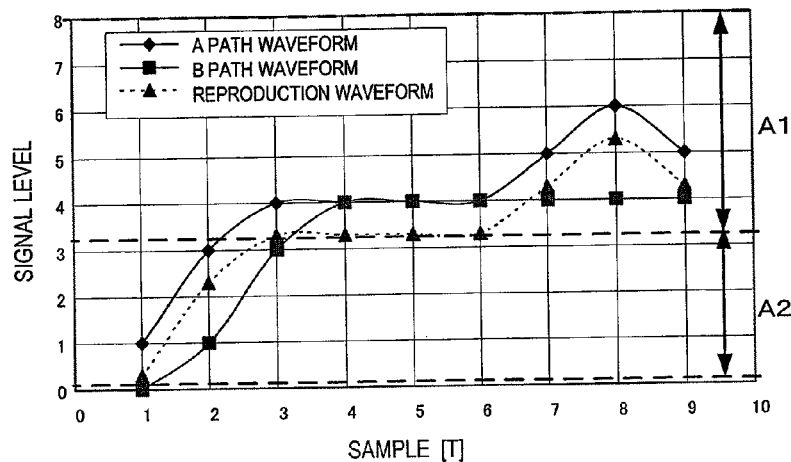
FIG. 8 shows an example of a reproduction waveform generated as a result of a DC variance from the RP equalization ideal waveform shown in FIG. 7.

Regarding the tolerable range of the β evaluation value, a more specific calculation example will be given with reference to FIG. 8. FIG. 8 is obtained by adding a reproduction waveform having a 2T DC variance to the 2T continuous pattern shown in FIG. 7 (pattern by which the Euclidean distance is 12). The dotted line with black triangles represents an exemplary reproduction waveform obtained from the A path waveform, which is determined to be correct by the Viterbi decoding. This reproduction waveform has a DC variance on the side closer to the B path waveform and thus is more likely to be incorrectly recognized as the B path waveform. In order to simplify the model, a uniform DC variance of –0.7 is added to the A path waveform. The ratio of this DC variance with respect to the detection window of the Euclidean distance (12) is about 47% as a result of calculation performed by expression (4).

$$\text{Detection window} = \frac{\left| \sum_{i=0}^{8} (PathA_i - S_i)^2 - \sum_{i=0}^{8} (PathB_i - S_i)^2 \right| - 12}{12 \times 2} \times 100 \qquad \text{Expression (4)}$$

In expression (4), Path A and Path B are PR equalization ideal values of the nine samples of the patterns shown in Table 3, and S is a reproduction waveform of the nine samples corresponding to prescribed patterns in Table 3.

When the ratio exceeds 50%, the waveform is ideally determined as the B path pattern. The β evaluation value at this point, which is calculated using A1 and A2 in FIG. 8 and expression (1) above, is about 0.2. This value is only for this model where the DC is varied by a uniform value, but the β evaluation value at least needs to be 0.2 or smaller in order to prevent the A path waveform from being incorrectly recognized as the B path waveform.

The PR12221ML evaluation index may be defined as the shift of the amplitude ratio of the mark and the space. However, in order to measure the PR12221ML evaluation index, it is necessary to PLL-synchronize the reproduction waveform and perform prescribed signal processing. Therefore, the PR12221ML evaluation index cannot be occasionally measured for a waveform with a very poor recording quality. There is a case where an environment for measuring the PR12221ML evaluation index is not provided. In such a case, even where the recording linear density is raised, a more analog evaluation index is demanded. Therefore, by defining the β evaluation index in consideration of the reproduction limit of PR12221ML, a range in which reproduction can be performed by the PR12221ML system can be defined. As a result, the recording quality of the recording medium can be controlled to be within a prescribed range, and so the recording and reproduction compatibility of the optical disc apparatus can be stably maintained.

The PRML system described above is merely an example, and the present invention is useful for other PRML systems.

For measuring β, the shortest possible mark or space length which can be regarded as corresponding to the maximum amplitude, or the longest possible mark or space length which can be regarded as corresponding to the minimum amplitude, varies depending on the recording linear density. Accordingly, the manner of detection processing varies. For example, at the 25 GB density of the BD format, the shortest possible mark or space length which can be regarded as corresponding to the maximum amplitude is about 5T. In the case where the recording is performed at a density of 33 GB on a BD, the shortest possible mark or space length which can be regarded as corresponding to the maximum amplitude is about 7T. Therefore, in order to detect the maximum or minimum amplitude, the manner of processing needs to be changed in accordance with the recording linear density.

For example, with a system of detecting the maximum and minimum amplitudes of the reproduction signal using the balance of the rise response and the fall response in an analog manner, when the recording linear density is changed, the response characteristic needs to be changed based on the capacity change in order to maintain the response characteristic.

(Embodiment 2)

Figure 9:
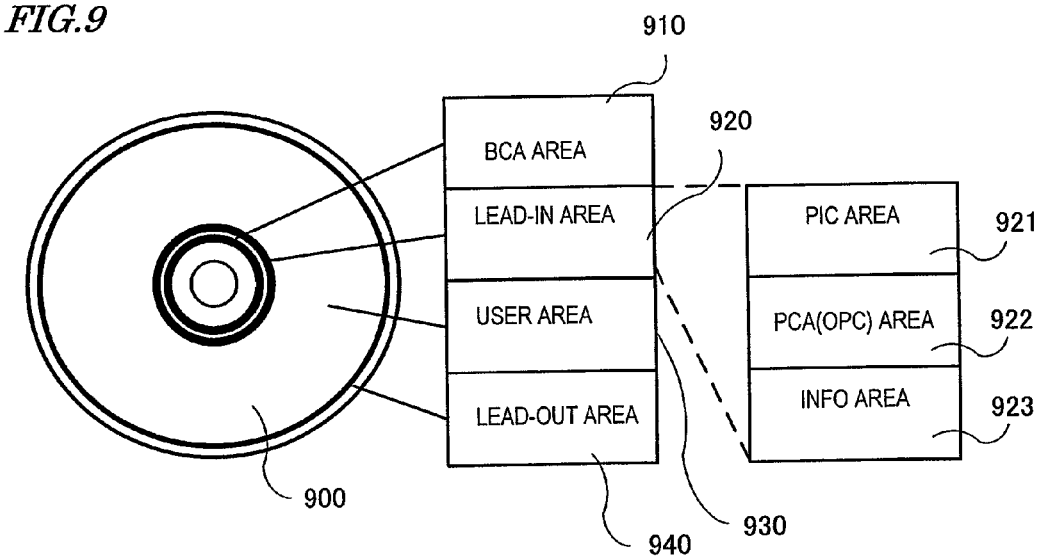
FIG. 9 shows an area arrangement of an optical disc medium according to an embodiment of the present invention.

Now, with reference to FIG. 9 and FIG. 10A, a structure of an optical disc medium and a structure of an optical disc apparatus will be described.

The optical disc medium 900 includes a recording layer. By forming a recording mark on the recording layer, data is recorded on the optical disc medium 900. On the optical disc medium 900, tracks are formed concentrically.

The optical disc medium 900 includes a BCA (Burst Cutting Area) area 910, a lead-in area 920, a user area 930 and a lead-out area 940.

The BCA area 910 has a bar code-like signal pre-recorded therein and includes a unique number for medium identification which is different disc by disc, copyright information, and disc characteristic information. The disc characteristic information includes the number of information recording layers and identification information on the address management method according to the present invention described above.

The user area 930 is structured to allow the user to record data. In the user area 930, user data is recorded, for example. The user data includes, for example, audio data and visual data.

Unlike the user area 930, the lead-in area 920 is not structured to allow the user to record data. The lead-in area 920 includes a PIC (Permanent Information and Control data) area 921, an OPC (Optimum Power Calibration) area (also referred to as a "PCA area") 922, and an INFO area 923.

The PIC area 921 has the disc characteristic information recorded therein. As the disc characteristic information, the number of information recording layers and the identification information of the address management method according to the present invention described above, as well as access parameters are recorded. The access parameters include, for example, a parameter regarding a laser power for forming a plurality of recording marks to, or erasing a plurality of recording marks from, the optical disc medium 900, and a parameter regarding a recording pulse width for recording a plurality of recording marks on the optical disc medium 900.

The PCA area 922 is an area usable for recording or reproducing test data. By recording or reproducing the test data, an optical disc apparatus for accessing the optical disc medium 900 adjusts the access parameters (for example, adjusts the recording power, the pulse width, etc.).

The INFO area 923 is used for recording management information on the user area 930 and data for defect management of the user area 930 which are necessary for the apparatus which accesses the optical disc medium 900.

A recording quality defining method according to the present invention changes the processing technique and the defining technique in accordance with the recording linear density and thus allows recording to be performed in the user area 930 at a recording quality within a prescribed range. As a result, the recording and reproduction compatibility of the recording disc apparatus can be stably maintained.

Now, an optical disc apparatus for measuring the recording quality for each recording linear density will be described.

Figure 10A:
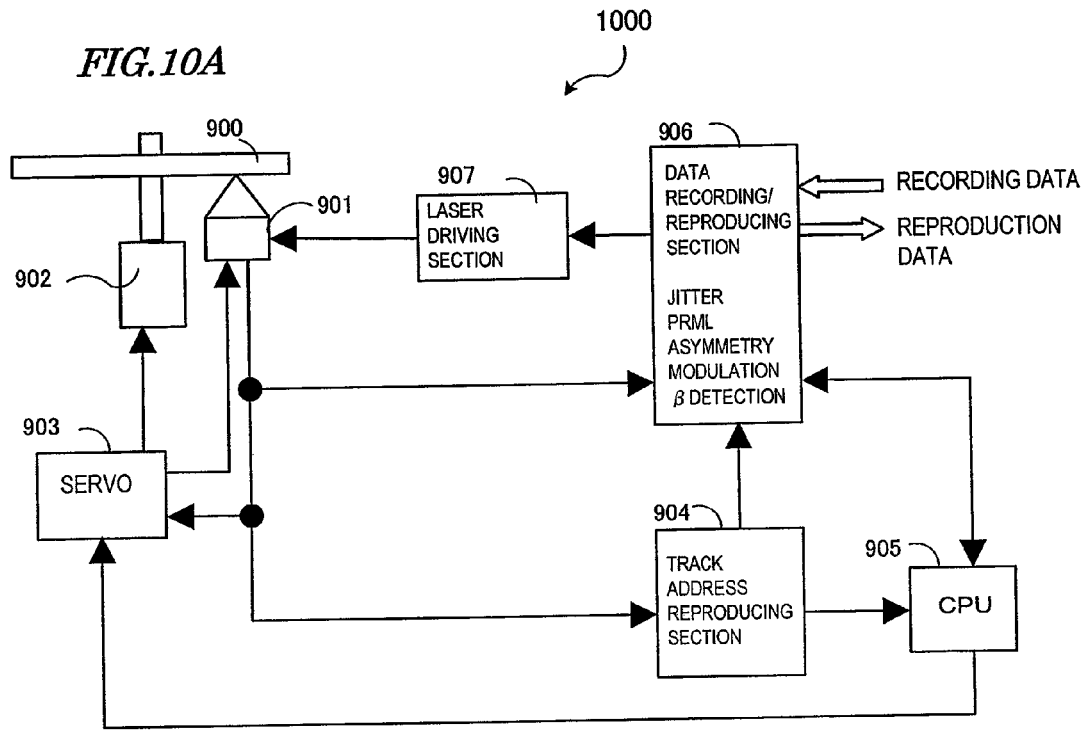
FIG. 10A is a block diagram showing a structure of an optical disc apparatus according to an embodiment of the present invention.

FIG. 10A is a block diagram showing an optical disc apparatus 1000 according to an embodiment of the present invention. In FIG. 10A, the optical disc apparatus includes an optical head 901, a motor 902, a servo circuit 903, a track address reproducing circuit 904, a CPU 905, a data recording/reproducing section 906 and a laser driving section 907; and reproduces data from an optical disc medium 900 mounted thereon or records data on the optical disc medium 900.

For performing reproduction from the optical disc medium 900, an information recording layer of the optical disc medium 900 is irradiated with a light beam. The light reflected by the information recording layer is received, and based on the received light, a reproduction signal corresponding to a recording mark recorded on the information recording layer is generated.

The optical disc medium 900 has a track on which data is to be recorded. Address values are recorded in accordance with an address format on the track. The track is formed in a wobbling shape, and the address values are recorded by the modulation of the frequency or the phase of the wobble.

The optical head 901 irradiates the optical disc medium 900 with a light beam, detects the amount of the light reflected by the optical disc medium 900 while scanning the track, and outputs an electric signal.

The motor 902 rotates the optical disc medium 900 at a specified rotation rate.

The servo circuit 903 extracts a servo error signal from the electric signal in accordance with the light collection state of the light beam on the track, and performs control using the servo error signal such that the light collection state of the light beam from the optical head 901 on the track and the scanning state of the track are optimum. The servo circuit 903 also controls the radial position on the optical disc medium 900 to be irradiated with the light beam and the rotation rate of the motor 902 to be optimum.

The track address reproducing section (track address reproducing circuit) 904 extracts a wobble signal from the electric signal in accordance with the wobbling of the track of the optical disc medium 900, and demodulates an address value pre-recorded on the track based on the wobble signal. The track address reproducing section 904 also detects the synchronization position on the track for each block and each sub block.

The CPU 905 acquires the address value demodulated by the track address reproducing circuit 904, instructs the servo circuit 903 to search for a block which is to be used for data recording and reproduction, and issues an instruction to the data recording/reproducing circuit 906 to perform a recording operation or a reproduction operation at the position of the block obtained by the search.

When instructed by the CPU 905 to record data, the data recording/reproducing section (data recording/reproducing circuit) 906 processes the recording data with addition of an error correction code, addition of a data address in accordance with a prescribed format and data modulation, and thus generates a recording signal. The data recording/reproducing circuit 906 controls the intensity of the light beam from the optical head 901 using the laser driving circuit 907, such that a mark in accordance with the recording signal is recorded on a specified block of the track, in compliance with the timing of the synchronization position detected by the track address reproducing circuit 904. Thus, the data is recorded.

When instructed by the CPU 905 to reproduce data, the data recording/reproducing circuit 906 extracts a data signal in accordance with a mark recorded on a specified block of the track of the optical disc medium 900 based on the electric signal, in compliance with the timing of the synchronization position detected by the track address reproducing circuit 904. The data recording/reproducing circuit 906 then demodulates the data from the data signal in accordance with the above-mentioned data modulation of the recording operation, and also performs error correction processing, to output reproduction data.

The data recording and reproducing circuit 906 includes a circuit for detecting a jitter index, an evaluation index accompanying the PRML processing, an asymmetry index, a modulation degree index and a β index from the reproduction signal. For obtaining a recording condition by the method described in the above embodiment, the jitter index, the evaluation index accompanying the PRML processing, the asymmetry index, the modulation degree index and the β index are detected from the reproduction signal and the detection results are output to the CPU 905.

The laser driving section (laser driving circuit) 907 controls the laser light emission operation of the optical head 901 in accordance with the laser light emission waveform pattern which is output from the data recording and reproducing circuit 906.

The jitter index, the evaluation index accompanying the PRML processing, the asymmetry index, the modulation degree index and the β index are described in detail in the above embodiment, and will not be described here.

An operation of the optical disc apparatus of changing the technique of measuring the amplitude ratio of the recording mark and the space in accordance with the recording linear density to reproduce the recorded area, and to measure the jitter index, the evaluation index accompanying the PRML processing, the asymmetry index, the modulation degree index and the β index will be described.

First, the recording condition pre-recorded on the optical disc is reproduced.

The CPU 905 instructs the servo circuit 903 to move the optical disc 901 to the PIC area and reproduces the PIC information including the recording condition using the data recording and reproducing circuit 906.

When the recording linear density is determined to be 25 GB/layer from the PIC condition, the CPU 905 moves the optical head 901 to the PCA area, sets the rotation rate of the motor 902 to a prescribed rate, and then records a specific recording pattern by a specific recording condition using the data recording and reproducing circuit 906 and the laser driving circuit 907. The CPU 905 performs reproduction from the recorded area using the data recording and reproducing circuit 906, and detects the jitter index, the modulation degree index and the asymmetry index. From the detected results, the CPU 905 calculates the optimum recording power. An example of a calculation method of the recording power is described in Patent Document 2 (Japanese Laid-Open Patent Publication No. 2006-147125). Using the obtained recording condition, a trial recording is performed, reproduction is performed from the area, and thus the jitter index and the asymmetry index are detected. When the detection results are within a prescribed range, it is determined that the recording quality is maintained to a prescribed level or higher, and the operation of finding the recording condition is completed.

The CPU 905 instructs the servo circuit 903 to move the optical head 901 to the user area and starts recording the user data using the data recording and reproducing circuit 906.

By contrast, when the recording linear density is determined to be 33 GB/layer from the PIC condition, the CPU 905 moves the optical head 901 to the PCA area, sets the rotation rate of the motor 902 to a prescribed rate, and then records a specific recording pattern by a specific recording condition using the data recording and reproducing circuit 906 and the laser driving circuit 907. The CPU 905 performs reproduction from the recorded area using the data recording and reproducing circuit 906, and detects the PRML index, the modulation degree index and the β index. From the detected results, the CPU 905 calculates the optimum recording power. An example of a calculation method of the recording power is described in Patent Document 2 (Japanese Laid-Open Patent Publication No. 2006-147125). Using the obtained recording condition, a trial recording is performed, reproduction is performed from the area, and thus the PRML index and the β index are detected. When the detection results are within a prescribed range, it is determined that the recording quality is maintained to a prescribed level or higher, and the operation of finding the recording condition is completed. The CPU 905 instructs the servo circuit 903 to move the optical head 901 to the user area and starts recording the user data using the data recording and reproducing circuit 906.

This operation is merely an example and does not limit the present invention. It is important to measure the amplitude ratio of the recording mark and the space suitable to the reproduction signal processing system which corresponds to the recording linear density. In this example, in the case of 25 GB/layer, the conventional reproduction signal processing based on the binary signal is selected, and the jitter index is measured accordingly. The recording quality is defined by the jitter index. Therefore, the recording quality can be further defined by the amplitude ratio of the recording mark and the space, which is measured based on the center of amplitude of the shortest mark and space, namely, the asymmetry index. Thus, the recording is performed to keep the recording quality within a prescribed range, and the compatibility of the optical disc apparatus is stabilized.

In the case of 33 GB/layer, the reproduction signal processing based on the PR12221ML system signal is selected, and the PR12221ML index is measured accordingly. The recording quality can be defined by the PR12221ML index. Therefore, the recording quality is further defined by the amplitude ratio of the recording mark and the space, which is measured based on the center of energy of the entire waveform, namely, the β index. Thus, the recording is performed to keep the recording quality within a prescribed range, and the compatibility of the optical disc apparatus is stabilized.

The elements of the optical disc apparatus according to the present invention can be implemented as an LSI, which is an integrated circuit. The elements of the optical disc apparatus may be individually formed as a one-chip device, or a part or the entirety thereof may be incorporated into a one-chip device.

Here, the integrated circuit is referred to as an LSI. The integrated circuit may be referred to as an IC, LSI, super LSI, or ultra LSI depending on the degree of integration.

The integrated circuit of the present invention is not limited to an LSI, and may be implemented as a dedicated circuit or a general purpose processor. An FPGA (Field Programmable Gate Array) which is programmable after the production of an LSI or a reconfigurable processor in which the circuit cell connection or setting in the LSI is reconfigurable may be used.

When another circuit integration technology replacing the LSI appears by the development of the semiconductor technologies or by derivation from the semiconductor technologies, such a technology may be used to integrate the functional blocks. Application of biotechnology or the like is one possibility.

(Embodiment 3)

Here, a novel asymmetry measuring method for defining the amplitude center ratio of the mark to be recorded and the space to be within a prescribed range so as to stabilize the compatibility of the optical disc apparatus will be described.

Asymmetry is defined by the ratio of the center of the reproduction signal amplitude of the shortest mark/space (2T amplitude center), with respect to the center of the reproduction signal amplitude of the longest mark/space (8T amplitude center). Where the frequency of the shortest mark is around, or exceeds, the OTF cutoff frequency, the amplitude is not detected as described above. Due to this problem, it is conventionally difficult to appropriately measure the amplitude center of the appropriate shortest mark/space. According to the present invention, the mark length acting as the reference for measuring the asymmetry is extended in accordance with the recording linear density, and the ratio of the mark length to be recorded and the space length is defined using such an extended mark length.

The amplitude center of the shortest mark/space among marks/spaces having a frequency lower than the OTF cutoff frequency is defined as the reference on the short mark side. With the 25 GB/layer Blu-ray format, the reference on the short mark side is 2T. For realizing 33 GB/layer, the reference is changed to 3T. With 25 GB/layer, the ideal 2T mark length is about 0.149 µm. With 33 GB/layer, the ideal 3T mark length is about 0.169 µm. This is slightly longer than the mark length based on the 2T reference with 25 GB/layer, but the substantially the same amplitude as in the case of 25 GB/layer can be detected. Thus, an appropriate amplitude center can be measured. With 25 GB/layer, the signal quality is defined by the jitter index. Therefore, the amplitude center and the amplitude of the shortest mark represented by a recording code needs to be defined to be within a prescribed range. The reason is that the amplitude center and the amplitude of the 2T shortest mark significantly influence the jitter index. Meanwhile, at the recording linear density at which the frequency of the shortest mark is around the OTF cutoff frequency, the reproduction system indispensably needs to perform PRML signal processing. Especially for the PR12221ML system, the 2T amplitude is not important, and the central value of the 2T amplitude greatly influences the reproduction performance. The central value of the 2T amplitude is greatly influenced by 3T, which is larger than 2T providing a sufficient amplitude, and is frequently generated. Accordingly, by defining the ratio of the center of the 3T amplitude and the center of the maximum amplitude to be within a prescribed range, the quality of the PR12221ML system can be maintained and a stable compatibility of the optical disc apparatus can be realized. Here, the frequency around the OTF cutoff frequency is, for example, 0.9 times to 1 time of the OTF cutoff frequency.

Figure 10B:
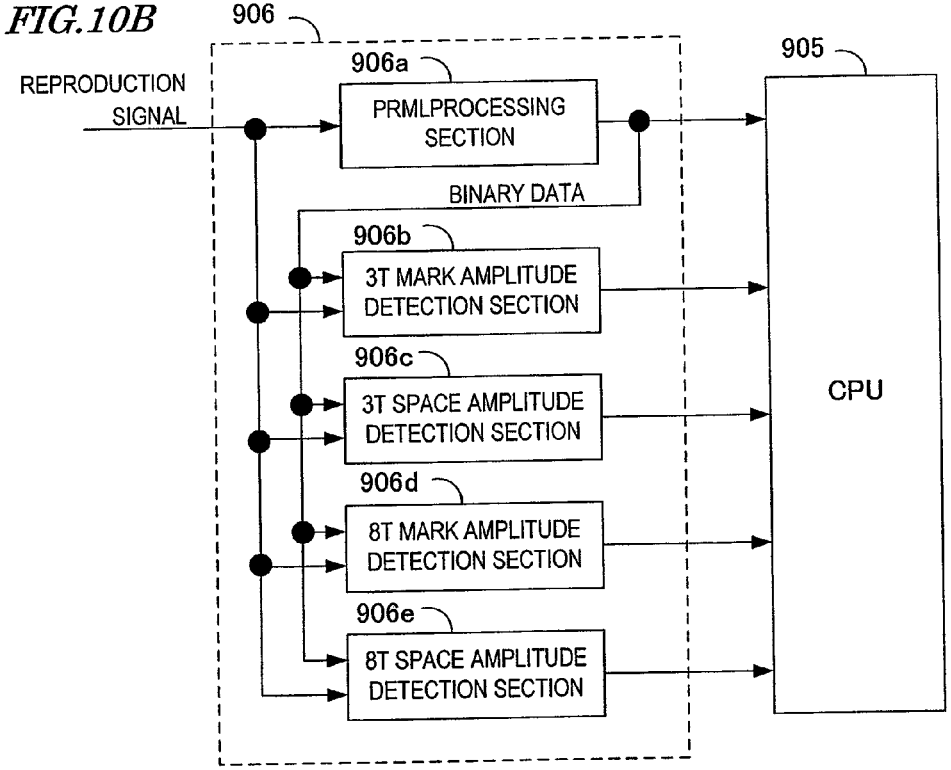
FIG. 10B is a block diagram showing a data recording/reproducing circuit according to an embodiment of the present invention.

With reference to FIG. 10B, an asymmetry measuring method using the 3T central amplitude measurement at the density of 33 GB/layer will be described. It is difficult to appropriately measure the central value of the 3T amplitude from a waveform obtained from high density recording. The reason is that where a 2T mark and a 2T space are adjacent to each other, the adjacent marks/spaces are greatly influenced by inter-code interference. Therefore, binary data of "0" and "1" obtained by decoding the reproduction signal by the PRML signal processing is detected and then, from such data, the amplitudes of a 3T mark, 3T space, 8T mark and 8T space included in the reproduction signal is detected. Owing to this, the amplitude of each mark can be detected with high precision. An example of such a detection circuit is shown in FIG. 10B. The data recording and reproducing circuit 906 shown in FIG. 10A includes the following elements shown in FIG. 10B: a PRML processing section 906a, a 3T mark amplitude detection section 906b, a 3T space amplitude detection section 906c, an 8T mark amplitude detection section 906d, and an 8T space amplitude detection section 906e. The PRML processing section 906a performs Viterbi decoding processing on the reproduction signal to generate binary data of "0" and "1". Each of the mark/space detection sections 906b through 906e detects a prescribed position of the reproduction signal (position of an amplitude corresponding to a prescribed mark length) from the binary data generated by the PRML processing section 906a, detects the average of the amplitudes, and outputs the average value to the CPU 905. The CPU 905 performs calculation for finding asymmetry to obtain an asymmetry evaluation index value. The CPU 905 calculates the asymmetry evaluation index value from the reproduction signal amplitude levels of the longest mark/space (8T) and the shortest mark/space having a frequency higher than the OTF cutoff frequency (3T). In the above, with reference to FIG. 12, a method for calculating asymmetry from a 2T amplitude and an 8T amplitude is described. Here, asymmetry calculation using a 3T amplitude, instead of the 2T amplitude, is performed. The calculation method is the same as represented by expression (3). In the case of a medium in which the reflectance of a recorded area is lower than the reflectance of an unrecorded area, the amplitude level of an 8T space is defined as amplitude A8H from reference level 0, the amplitude level of an 8T mark is defined as amplitude A8L from reference level 0, the amplitude level of a 3T space is defined as amplitude A3H from reference level 0, and the amplitude level of a 3T mark is defined as amplitude A3L from reference level 0. The asymmetry evaluation index value (ASYM) is found by the following expression (5).

$$ASYM = \frac{\frac{A8H + A8L}{2} - \frac{A3H + A3L}{2}}{A8H - A8L} \tag{5}$$

With this index value, it can be defined how much the center of the amplitude of the shortest mark/space (3T) which has a frequency higher than the OTF cutoff frequency or the center of the amplitude of the longest mark/space (8T) is DC-shifted with respect to the entire amplitude of the reproduction signal of the longest mark/space (8T). In order to maintain the recording quality to a prescribed level or higher, the recording needs to be controlled such that the asymmetry evaluation index value (ASYM) is within a prescribed range. For example, the asymmetry evaluation index value is restricted to $-0.1 \leq ASYM \leq 0.1$. With this range, the reproduction quality can be maintained by the PRML signal processing.

As described above, the present invention adaptably changes the index used for defining the symmetry of the recording mark and the space in accordance with the recording linear density (channel bit length). In the above, it is explained that instead of the asymmetry index value for defining the ratio of the 2T amplitude center and the 8T amplitude center, the β index value is used (Embodiments 1 and 2), and the asymmetry index value for defining the ratio of the 3T amplitude center and the 8T amplitude center is used (Embodiment 3).

Expressions (3) and (5) are provided above regarding a recording medium in which the reflectance of a recorded area is lower than the reflectance of an unrecorded area (HTL: High to Low). By contrast, in the case of a recording medium in which the reflectance of an unrecorded area is lower than the reflectance of a recorded area (LTH: Low to High), the amplitude level relationship is opposite to the case of HTL. Namely, in the case of LTH, the amplitudes can be defined as follows in expression (3) (or expression (5)):

Amplitude A8H is an amplitude level of an 8T mark from the reference level 0;

Amplitude A8L is an amplitude level of an 8T space from the reference level 0;

Amplitude A2H (or A3H) is an amplitude level of a 2T (or 3T) mark from the reference level 0; and Amplitude A2L (or A3L) is an amplitude level of a 2T (or 3T) space from the reference level 0.

Namely, asymmetry can be calculated either in HTL or LTH based on the relationship between the amplitude center of an xT mark and an xT space and the amplitude center of a yT mark and a yT space (x and y are natural numbers fulfilling x<y). On an information recording layer, a recording mark restricted to have a length of xT to yT is formed in accordance with a prescribed modulation rule. T is the reference cycle of modulation.

In the case where x is a code length corresponding to the length of the shortest mark and y is a code length corresponding to the length of the longest mark, the asymmetry defines the ratio of the amplitude center of the shortest mark and the shortest space and the amplitude center of the longest mark and the longest space. In this case, the second shortest mark is represented as an (x+1) mark, and the second shortest space is represented as an (x+1) space.

In the case where x is a code length corresponding to the length of the second shortest mark, the asymmetry defines the ratio of the amplitude center of the second shortest mark and the second shortest space and the amplitude center of the longest mark and the longest space.

The second shortest mark is a mark which is shortest next to the shortest mark. For example, where the shortest mark length is 2T, the second shortest mark length is 3T. Similarly, the second shortest space is a space which is shortest next to the shortest space. For example, where the shortest space length is 2T, the second shortest space length is 3T.

In the above, the range of the asymmetry evaluation index value (ASYM) in expressions (3) and (5) is described as, for example, $-0.1 \leq ASYM \leq 0.1$. This is merely an example, and the present invention is not limited to this. For example, in expressions (3) and (5), the range of the asymmetry evaluation index value (ASYM) may be −0.10 or higher, or may be +0.15 or lower. Alternatively, the range of the asymmetry evaluation index value (ASYM) may be −0.10 or higher and +0.15 or lower.

According to this embodiment, where the recording density of an information recording layer is a first recording density (for example, 25 GB), the information recording medium is evaluated using an evaluation index which is found based on the ratio of the amplitude center of a reproduction signal corresponding to the shortest mark and the shortest space, with respect to the amplitude center of a reproduction signal corresponding to the longest mark and the longest space. Where the recording density of an information recording layer is a second recording density which is higher than the first recording density (for example, 33 GB), the information recording medium is evaluated using an evaluation index which is found based on the ratio of the amplitude center of a reproduction signal corresponding to the second shortest mark and the second shortest space, with respect to the amplitude center of a reproduction signal corresponding to the longest mark and the longest space. The ratio of the amplitude of a reproduction signal corresponding to the recording mark to be recorded on the information recording layer, with respect to the amplitude of a reproduction signal corresponding to the space is restricted, such that the value of the evaluation index is within a prescribed range.

As described above, the restriction on the ratio of the amplitude of a reproduction signal corresponding to the recording mark, with respect to the amplitude of a reproduction signal corresponding to the space may be, for example, any one of the following: restriction made such that the evaluation index value is −0.10 or higher, restriction made such that the evaluation index value is +0.15 or lower, and restriction made such that the evaluation index value is −0.10 or higher and +0.15 or lower.

In the above embodiments, an optical disc on which data is recordable and an optical disc apparatus corresponding thereto (for example, recorder) are described as an example. For the evaluation itself such as asymmetry evaluation and β evaluation, a recording operation is not indispensable. Hence, the present invention is also applicable to a reproduction-only optical disc having data pre-recorded thereon or an optical disc apparatus corresponding thereto (player or recorder for performing recording on a ROM disc, etc.)

Now, recording density will be described.

Figure 11:
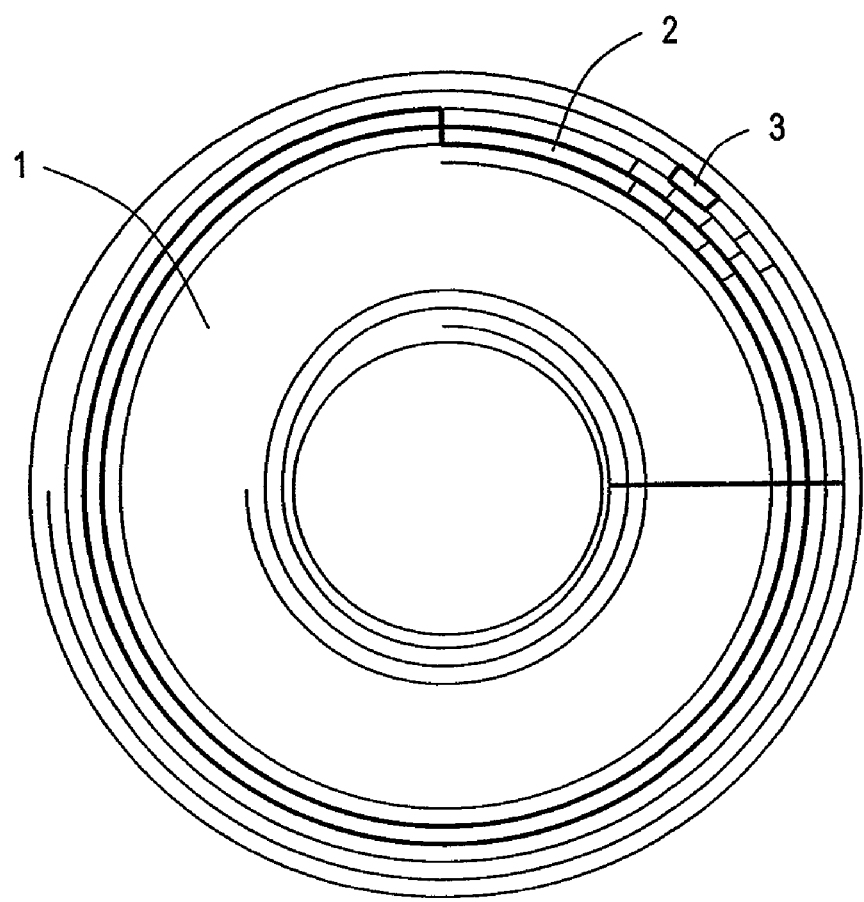
FIG. 11 shows a physical structure of an optical disc 1 according to an embodiment of the present invention.

FIG. 11 shows a physical structure of an optical disc 1 according to this embodiment of the present invention. On a discus-shaped optical disc 1, a great number of tracks 2 are formed concentrically or in a spiral, for example. In each track 2, a great number of tiny sectors are formed. As described later, data is recorded on each track 2 in units of blocks 3 each having a predetermined size.

The optical disc 1 according to this embodiment of the present invention has an expanded recording capacity per information recording layer as compared with a conventional optical disc (for example, a BD of 25 GB). The recording capacity is expanded by raising the recording linear density, for example, by decreasing the length of a recording mark recorded on the optical disc. Here, the expression "raising the recording linear density" means to decrease the channel bit length. The "channel bit length" refers to a length corresponding to the cycle T of the reference clock (the reference cycle T of modulation when a mark is recorded by a prescribed modulation rule).

The optical disc 1 may include a plurality of layers. In the following, only one information recording layer will be described for the convenience of explanation.

Even where the width of the track is the same among a plurality of layers provided in the optical disc, the recording linear density may be varied on a layer-by-layer basis by changing the mark lengths on a layer-by-layer basis according to a certain manner.

The track 2 is divided into blocks by a data recording unit of 64 kB (kilobytes), and the blocks are sequentially assigned block address values. Each block is divided into sub blocks each having a prescribed length. Three sub blocks form one block. The sub blocks are assigned sub block numbers of 0 through 2 from the first sub block.

Figure 12:
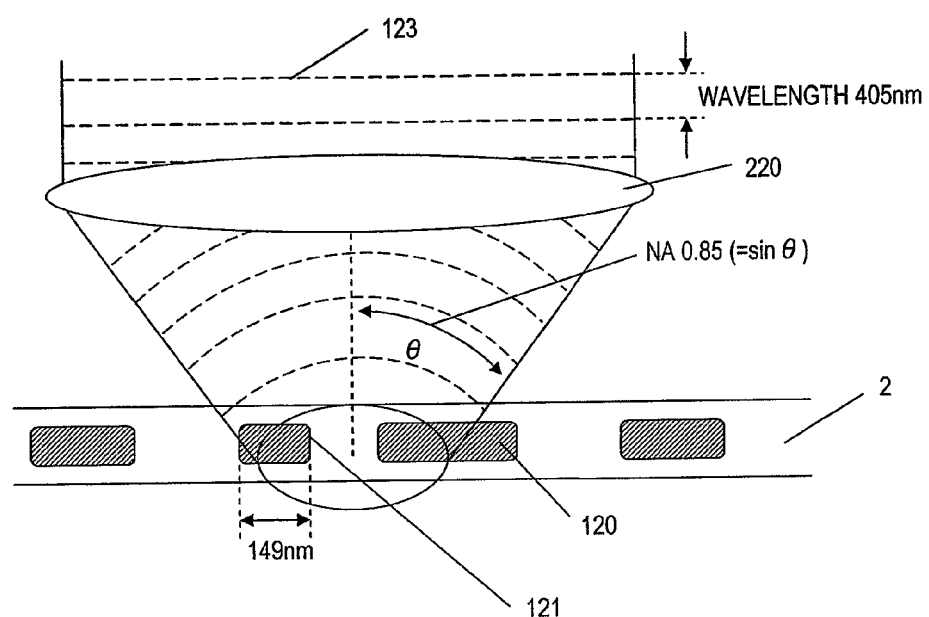
FIG. 12(A) shows an example of a BD having a recording capacity of 25 GB.
FIG. 12(B) shows an example of an optical disc having a higher recording density than that of the BD having a recording capacity of 25 GB.
Figure 12:
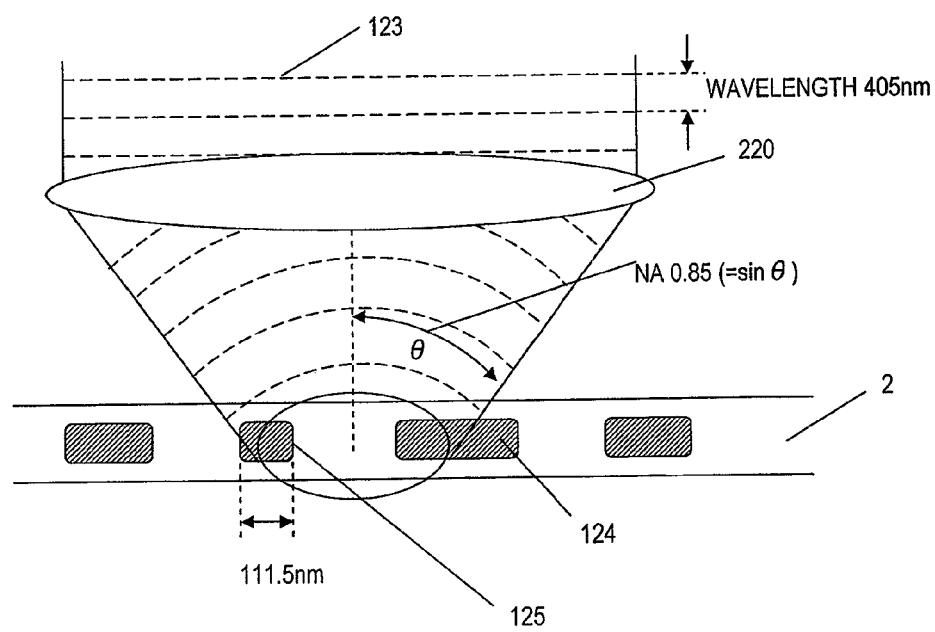

Now, the recording linear density will be described with reference to FIG. 12, FIG. 13 and FIG. 14.

FIG. 12(A) shows an example of a BD of 25 GB. For the BD, the wavelength of laser light 123 is 405 nm and the numerical aperture (NA) of an objective lens 220 is 0.85.

Like in a DVD, in the BD also, the recording data is recorded as marks 120 and 121 formed by a physical change on the track 2 of the optical disc. A mark having the shortest length among these marks is referred to as the "shortest mark". In the figure, the mark 121 is the shortest mark.

In the case of the BD having a recording capacity of 25 GB, the physical length of the shortest mark is 0.149 μm. This corresponds to about 1/2.7 of that of a DVD. Even if the resolving power of the laser light is raised by changing the parameters of the wavelength (405 nm) and the NA (0.85) of the optical system, the physical length of the shortest mark is close to the limit of the optical resolving power, i.e., the limit at which a light beam can identify a recording mark.

Figure 13:
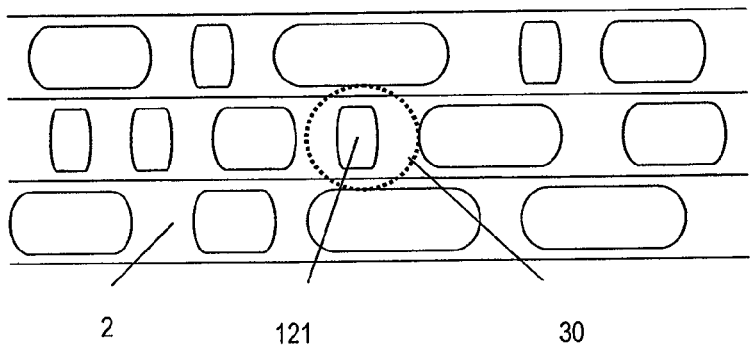
FIG. 13 shows how a mark recorded on the track is irradiated with a light beam.

FIG. 13 shows how a mark recorded on the track is irradiated with a light beam. In the BD, an optical spot 30 has a diameter of about 0.39 μm because of the above-mentioned parameters of the optical system. When the recording linear density is raised without changing the structure of the optical system, the recording mark becomes small with respect to the diameter of the optical spot 30, and therefore the resolving power for reproduction is declined.

For example, FIG. 12(B) shows an example of an optical disc having a higher recording density than that of the BD of 25 GB. For this disc also, the wavelength of the laser light 123 is 405 nm and the numerical aperture (NA) of the objective lens 220 is 0.85. A mark shortest among the marks 125 and 124, namely, the mark 125, has a physical length of 0.1115 μm. As compared with the BD shown in FIG. 12(A), in the disc in FIG. 12(B), the diameter of the spot is the same at about 0.39 μm but the recording mark is smaller and the inter-mark gap is narrower. Therefore, the resolving power for reproduction is declined.

An amplitude of a reproduction signal obtained by reproducing a recording mark using a light beam decreases as the recording mark is shortened, and becomes almost zero at the limit of the optical resolving power. The inverse of the cycle of the recording mark is called "spatial frequency", and the relationship between the spatial frequency and the signal amplitude is called OTF (Optical Transfer Function). The signal amplitude decreases almost linearly as the spatial frequency increases. The critical frequency for reproduction at which the signal amplitude becomes zero is called "OTF cutoff".

Figure 14:
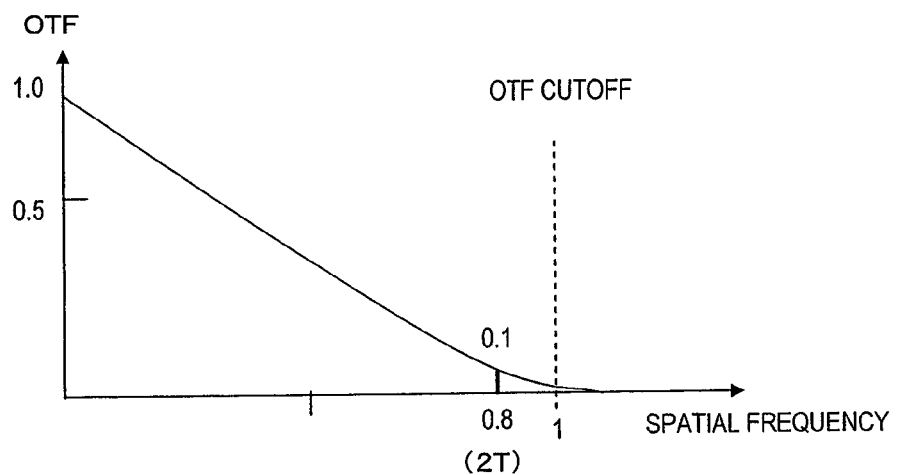
FIG. 14 shows the relationship between the OTF and the shortest recording mark regarding a BD having a recording capacity of 25 GB.

FIG. 14 shows the relationship between the OTF and the shortest recording mark regarding the BD having a recording density of 25 GB. The spatial frequency of the shortest recording mark of the BD is about 80% with respect to the OTF cutoff, which is close to the OTF cutoff. It is also seen that the amplitude of the reproduction signal of the shortest mark is very small at about 10% of the maximum detectable amplitude. For the BD, the recording capacity at which the spatial frequency of the shortest recording mark is the OTF cutoff, i.e., the recording capacity at which the reproduction amplitude of the shortest mark is almost zero, is about 31 GB. When the frequency of the reproduction signal of the shortest mark is around, or exceeds, the OTF cutoff frequency, the resolving power of the laser light is close to the limit or may exceed the limit. In such an area, the amplitude of the reproduction signal decreases and the S/N ratio is drastically deteriorated.

Therefore, the recording linear density which is assumed for the high recording density optical disc in FIG. 12(B) corresponds to a frequency of the shortest mark of the reproduction signal which is around the OTF cutoff (including a frequency which is equal to or lower than the OTF cutoff, but is not significantly lower than the OTF cutoff) or equal to or higher than the OTF cutoff frequency. As the recording capacity, the following can be considered. In the case where the frequency is around the OTF cutoff, the recording capacity may be, for example, about 29 GB (e.g., 29 GB±0.5 GB or 29 GB±1 GB, etc.), equal to or larger than 29 GB, about 30 GB (e.g., 30 GB±0.5 GB or 30 GB±1 GB, etc.), equal to or larger than 30 GB, about 31 GB (e.g., 31 GB±0.5 GB or 31 GB±1 GB, etc.), equal to or larger than 31 GB, about 32 GB (e.g., 32 GB±0.5 GB or 32 GB±1 GB, etc.), or equal to or larger than 32 GB. In the case where the frequency is equal to or higher than the OTF cutoff, the recording capacity may be, for example, about 32 GB (e.g., 32 GB±0.5 GB or 32 GB±1 GB, etc.), equal to or larger than 32 GB, about 33 GB (e.g., 33 GB±0.5 GB or 33 GB±1 GB, etc.), equal to or larger than 33 GB, about 33.3 GB (e.g., 33.3 GB±0.5 GB or 33.3 GB±1 GB, etc.), equal to or larger than 33.3 GB, about 34 GB (e.g., 34 GB±0.5 GB or 34 GB±1 GB, etc.), equal to or larger than 34 GB, about 35 GB (e.g., 35 GB±0.5 GB or 35 GB±1 GB, etc.), or equal to or larger than 35 GB. Where the recording density is 33.3 GB, about 100 GB (99.9 GB) is realized by three layers. Where the recording density is 33.4 GB, 100 GB or higher (100.2 GB) is realized by three layers. This corresponds to four 25 GB layers of the BD. An increase of the number of layers is accompanied by influences of the reduction of the reproduction signal amplitude in each recording layer (deterioration of the S/N ratio) and of the stray light among the multiple layers (signal from an adjacent recording layer). By adopting the recording density of about 33.3 GB or greater, the recording density of about 100 GB (about 100 GB or greater) can be realized while such influences are suppressed, namely, with a smaller number of layers (three layers).

Figure 15:
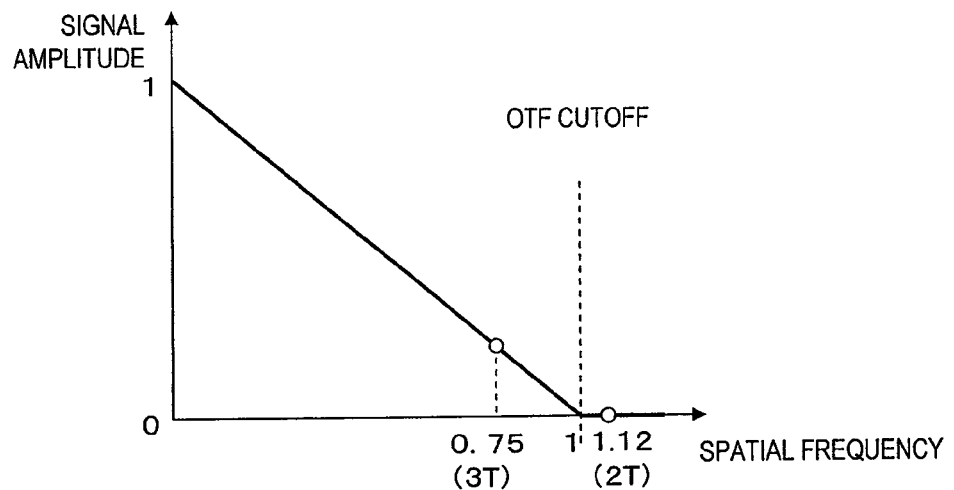
FIG. 15 shows an example in which the spatial frequency of the shortest mark (2T) is higher than the OTF cutoff frequency and the amplitude of a 2T reproduction signal is 0.

FIG. 15 shows an example in which the spatial frequency of the shortest mark (2T) is higher than the OTF cutoff frequency and the amplitude of a 2T reproduction signal is 0. The spatial frequency of the shortest mark, 2T, is 1.12 times of the OTF cutoff frequency.

The relationship among the wavelength, the numerical aperture, and the length of a mark/space in the high recording density disc B is as follows.

Where the shortest mark length is TM nm and the shortest space length is TS nm, the shortest mark length+the shortest space length (P) is TM+TS nm. In the case of the 17 modulation, P=2T+2T=4T. Where the three parameters, i.e., the laser light wavelength λ (405 nm±5 nm, i.e., 400 through 410 nm), the numerical aperture NA (0.85±0.01, i.e., 0.84 through 0.86), and the shortest mark length+the shortest space length (P) are used, when the reference T decreases to fulfill P≦λ/2NA, the spatial frequency exceeds the OTF cutoff frequency.

The reference T corresponding to the OTF cutoff frequency when NA=0.85 and λ=405 nm is:

$$T=405/(2\times 0.85)/4=59.558 \text{ nm.}$$

By contrast, where P>λ/2NA, spatial frequency is lower than the OTF cutoff frequency.

The length TM+TS, which is obtained by adding the shortest mark length TM and the shortest space length TS is, for example, less than 238.2 nm.

As seen from this, by merely raising the recording density, the S/N ratio is deteriorated due to the limit of the optical resolving power. Therefore, an increase of the number of information recording layers may occasionally result in intolerable S/N ratio deterioration from the viewpoint of the system margin. The S/N ratio deterioration is especially conspicuous when the frequency of the shortest recording mark is around or exceeds the OTF cutoff frequency as described above.

In the above, the recording density is described through a comparison of the frequency of the reproduction signal of the shortest recording mark and the OTF cutoff frequency. When the recording density is further raised, a recording density (recording linear density, recording capacity) for each case can be set by the relationship between the frequency of the reproduction signal of the second shortest mark (or even the frequency of the reproduction signal of the third shortest mark; i.e., the frequency of the reproduction signal of the second shortest or further shorter mark) and the OTF cutoff frequency based on the principle similar to the above.

Now, with reference to FIG. 16A, a structure an optical disc 400 will be described.

Figure 16A:
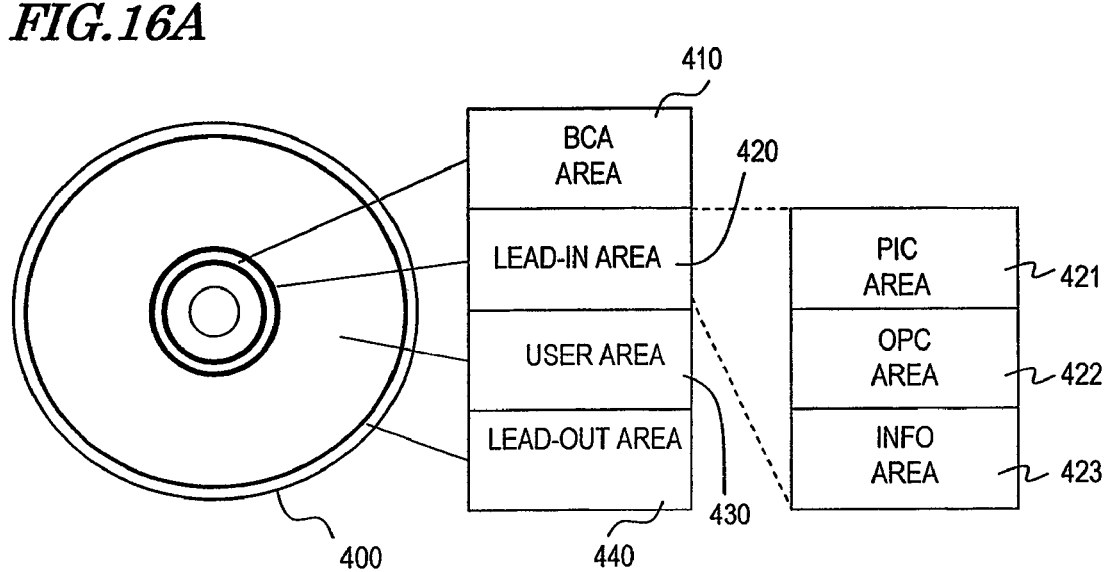
FIG. 16A shows an area arrangement of an optical disc 400.

FIG. 16A shows an area arrangement of the optical disc 400.

The optical disc 400 includes an information recording layer. By forming a recording mark on the information recording layer, data is recorded on the optical disc 400. On the optical disc 400, tracks are formed concentrically.

The optical disc 400 includes a BCA (Burst Cutting Area) area 410, a lead-in area 420, a user area 430 and a lead-out area 440.

The BCA area 410 has a bar code-like signal pre-recorded therein and includes a unique number for medium identification which is different disc by disc, copyright information, and disc characteristic information. The disc characteristic information includes the number of information recording layers and identification information on the address management method. As the disc characteristic information, information representing the number of information recording layers itself, prescribed bit information in accordance with the permitted number of information recording layers, or information on the recording density is, for example, included. As the information on the recording density, information representing the recording capacity of the optical disc or information representing the channel bit length (recording linear density) is, for example, included.

In a reproduction-only disc, the information on the recording density may be stored in the BCA area and/or inside the recording data (concave/convex pits) (recorded as a data address added to the data). In a write once or rewritable recording disc, the information on the recording density may be stored in the BCA area and/or a PIC area, and/or a wobble (recorded as sub information superimposed on the wobble). The information on the recording density may be information representing the recording capacity of the information recording layer. Alternatively, the information on the recording density may be information representing the channel bit length of the information recording layer. The information on the recording density is, for example, recorded in the BCA area 410 or the PIC area 421, and reproduced from such an area.

The user area 430 is structured to allow the user to record arbitrary data. In the user area 430, user data is recorded, for example. The user data includes, for example, audio data and visual (video) data.

Unlike the user area 430, the lead-in area 420 is not structured to allow the user to record arbitrary data. The lead-in area 420 includes a PIC (Permanent Information and Control area) area 421, an OPC (Optimum Power Calibration) area 422, and an INFO area 423.

The PIC area 421 has the disc characteristic information recorded therein. As the disc characteristic information, the number of information recording layers and the identification information of the address management method mentioned above, as well as access parameters, for example, are recorded. The access parameters include, for example, a parameter regarding a laser power for forming a plurality of recording marks to, or erasing a plurality of recording marks from, the optical disc 400, and a parameter regarding a recording pulse width for recording a plurality of recording marks on the optical disc 400.

In this embodiment, the disc characteristic information is stored in both of the BCA area 410 and the PIC area 421. This is a mere example, and the present invention is not limited to this. For example, the disc characteristic information may be stored either in the BCA area, in the PIC area, inside the recording data, or in the wobble; or in two or more thereof. Where the same disc characteristic information is recorded at a plurality of sites, such information can be read at any of the plurality of sites. This can guarantee the reliability of the disc characteristic information. Where the disc characteristic information is stored in predetermined areas, the optical disc apparatus can find the number of information recording layers of the disc and the like with certainty even if the type of disc is not known.

In the case where there are a plurality of information recording layers, the information recording layer having the disc characteristic information located thereon (reference layer) may be, for example, a layer farthest from the optical head, in other words, a layer farthest (deepest) from the surface on which the laser light is incident (light radiation surface). Between the reference layer and an information recording layer located closer to the light radiation surface than the reference layer, a spacer layer is located. The reference layer includes an area for storing information on the recording density.

In order to make the optical disc compatible with conventional optical disc apparatuses produced to be used only for BDs, it is desirable that the track address format is changed for each recording linear density such that the layer information on the reference layer is not changed from in the conventional art.

Hereinafter, with reference to FIG. 16B, this will be described in more detail.

FIG. 16B(1) shows a structure of an information recording layer of the disc A having the conventional recording density and the disc B having a higher recording density. FIGS. 16B(2) and (3) respectively show a specific structure of the lead-in area 420 of the disc A and the disc B.

FIG. 16B(1) shows an information recording layer of an optical disc. Sequentially from the innermost side (left in the figure), a clamp area, the BCA area 410, the lead-in area 420 and the user data area 430 are located.

FIG. 16B(2) shows a specific example of an arrangement of the lead-in area 420 of the reference layer of the disc A. The PIC area 421 has a prescribed radial distance A from a radial position of 22.2 mm. FIG. 16B(3) shows a specific example of an arrangement of the lead-in area 420 of the reference layer of the disc B. The PIC area 421 has a prescribed radial distance B from a radial position of 22.2 mm. What is characteristic here is that the radial distance B of the PIC area 421 of the disc B is the same as the radial distance A of the PIC area 421 of the disc A.

When information is recorded in the PIC area 421 on the disc B simply with a higher recording density, the channel bit length is shorter. It is considered that the radial distance B of the PIC area 421 may also be shortened in accordance therewith. However, the PIC area 421 of the disc B stores important information for accesses and so needs to be kept safely reproduceable. For example, an optical disc drive which reads information stored in the PIC area 421 by mechanically moving the optical disc to a predetermined position with high precision may not reproduce the information when the radial distance of the PIC area 421 is shortened. In order to keep lower compatibility with such a drive, it is preferable that the radial distance B is the same as the radial distance A.

For example, the following two methods are conceivable for making the radial distance B the same as the radial distance A. A first method is to record information in the PIC area of the disc B at the same recording linear density as that of the disc A, instead of the recording linear density of the disc B. In this case, even within the lead-in area, the recording linear density may occasionally be varied position by position. A second method is to record information in the PIC area with the recording linear density of the disc B and increase the number of times the recording is repeated. The information to be recorded in the PIC area is important and so is recorded repeatedly in order to guarantee the reliability. Such recording is performed at a higher recording linear density and a larger number of times (for example, 7 times instead of 5 times). Thus, the radial distance B can be made the same as the conventional radial distance A.

The OPC area 422 is an area usable for recording or reproducing test data. By recording or reproducing the test data, an optical disc apparatus for accessing the optical disc 400 adjusts the access parameters (for example, adjusts the recording power, the pulse width, etc.).

The INFO area 423 is used for recording management information on the user area 430 and data for defect management of the user area 430 which are necessary for the apparatus which accesses the optical disc 400.

Figure 16C:
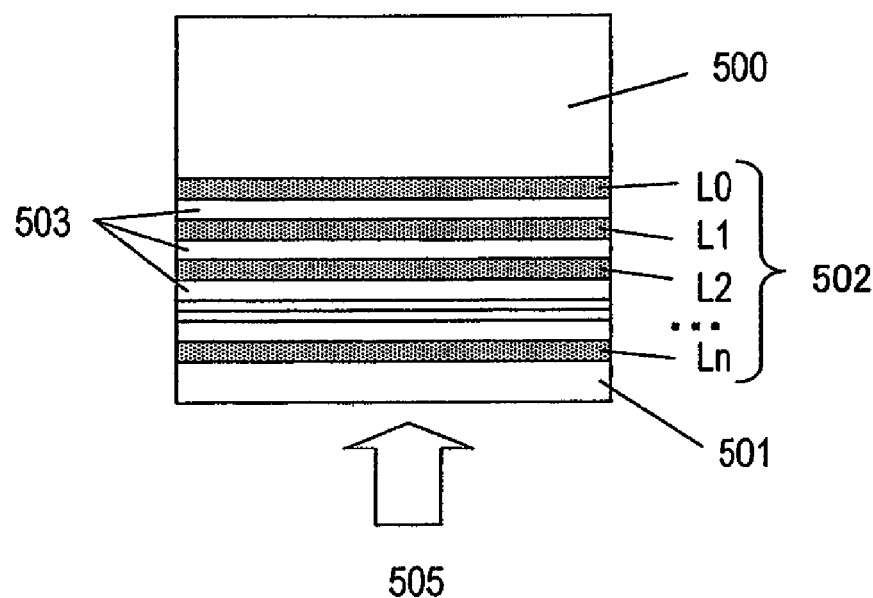
FIG. 16(C) shows an example of a structure of a multi-layer phase change thin film disc.
Figure 17:
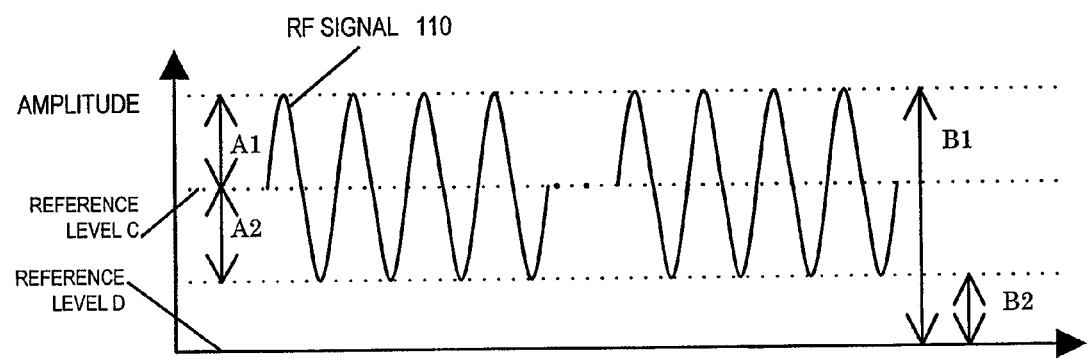
FIG. 17 shows a definition of amplitude parameters of an RF signal for finding β and modulation of an optical disc according to an embodiment of the present invention.

FIG. 16C shows an example of a structure of a multi-layer phase change thin film disc. The optical disc shown in the figure includes (n+1) pieces of information recording layers 502. More specifically, the optical disc includes a cover layer 501, (n+1) pieces of information recording layers (Nn through L0 layers) 502, and a polycarbonate substrate 500 which are sequentially stacked from a surface on which laser light 505 is incident. Between the (n+1) pieces of information recording layers 502, spacer layers 503 acting as optical buffer members are inserted.

The spacer layer adjacent to the reference layer may have a larger width than the other spacer layers. In the case where the optical disc apparatus performs focusing and tracking control on a layer different from the reference layer and thus reads address information before recognizing the disc characteristic information, the address position may possibly be incorrectly recognized. The reason is that the locations of the layer information and the block address information in such a layer may occasionally be different from those in the reference layer. In order to avoid this, a spacer layer between the reference layer and the other layers may be made thicker than a spacer layer between the other layers, so that incorrect recognition of the address is prevented. For example, according to the disc format of two-layer BDs, the reference layer L0 is located at a depth of about 100 μm from the surface on which the laser light is incident, and L1 layer is located at a depth of about 75 μm. According to the present invention, in order to prevent the focusing and tracking control from being performed on the L1 layer by mistake, L1 layer and other recording layers to be located closer to the laser light incidence surface may be located closer to the laser light incidence surface than the depth of 75 μm. For example, L1 layer may be located at a depth of 70 μm. (However, if the spacer layer between the reference layer and L1 layer has an excessively large width (thickness), it is difficult to obtain a sufficient width for the spacer layers between L2 layer and the other recording layers closer to the laser light incidence surface. Hence, the widths of the spacer layers need to be determined so as to provide a good balance such that the focusing and tracking control is not performed on L1 layer by mistake while the other spacer layers have a sufficient width.)

The elements of the optical disc apparatus according to the present invention can be implemented as an LSI, which is an integrated circuit. The elements of the optical disc apparatus may be individually formed as a one-chip device, or a part or the entirety thereof may be incorporated into a one-chip device.

Here, the integrated circuit is referred to as an LSI. The integrated circuit may be referred to as an IC, LSI, super LSI, or ultra LSI depending on the degree of integration.

The integrated circuit of the present invention is not limited to an LSI, and may be implemented as a dedicated circuit or a general purpose processor. An FPGA (Field Programmable Gate Array) which is programmable after the production of an LSI or a reconfigurable processor in which the circuit cell connection or setting in the LSI is reconfigurable may be used.

When another circuit integration technology replacing the LSI appears by the development of the semiconductor technologies or by derivation from the semiconductor technologies, such a technology may be used to integrate the functional blocks. Application of biotechnology or the like is one possibility.

Finally, a brief supplemental explanation will be given regarding a BD (Blu-ray disc) as an example of optical disc according to the present invention. The main optical constants and physical formats of a Blu-ray disc are disclosed in "Blu-ray Disc Dokuhon" (Blu-ray Handbook) published by Ohmsha, Ltd. or the white papers put on the web site of the Blu-ray Association (http://www.blu-raydisc.com/).

For the BD, laser light having a wavelength of 405 nm (where the tolerable error range is ±5 nm, 400 to 410 nm) and an objective lens having an NA of 0.85 (where the tolerable error range is ±0.01 nm, 0.84 to 0.86) are used. The track pitch of the BD is 0.32 μm, and one or two recording layers are provided. One or two recording layers, namely, the recording surface(s) thereof, are provided on one side on which the laser light is incident. The distance from the surface of a protection layer to the recording surface is 75 μm to 100 μm. As the modulation system for a recording signal, 17PP modulation is used. The shortest mark length to be recorded (2T mark) is 0.149 μm (channel bit length T: 74.50 nm). The recording capacity is 25 GB (or 27 GB) (more precisely, 25.025 GB (or 27.020 GB) where one layer is provided on one side, or 50 GB (or 54 GB) (more precisely, 50.050 GB (or 54.040 GB) where two layers are provided on one side).

The channel clock frequency is 66 MHz (channel bit rate: 66.000 Mbits/s) at the BD standard rate (1×), 264 MHz (channel bit rate: 264.000 Mbits/s) at the 4× transfer rate (BD4×), 396 MHz (channel bit rate: 396.000 Mbits/s) at the 6× transfer rate (BD6×) rate, and 528 MHz (channel bit rate: 528.000 Mbits/s) at the 8× transfer rate (BD8×). The standard linear density (reference linear density 1×) is 4.917 m/sec.

The thickness of a protective layer (cover layer) is decreased as follows as the numerical aperture is increased and so the focal distance is shortened. The thickness of the protective layer is also decreased in order to suppress the influence of a spot distortion caused by a tilt. In contrast to 0.6 mm in the case of a DVD, the thickness of the protective layer of a BD may be 10 to 200 μm among the total thickness of the medium of about 1.2 mm (more specifically, where the substrate has a thickness of about 1.1 mm, a transparent protective layer having a thickness of about 0.1 mm is provided in a single layer disc, and a protective layer having a thickness of about 0.075 mm and a spacer layer having a thickness of about 0.025 mm are provided in a two layer disc). In a disc including three or more layers, the thickness of the protective layer and/or the spacer layer is further decreased.

In order to protect such a thin protective layer against being damaged, a projection may be provided outside or inside a clamp area. Especially where the projection is provided inside the clamp area, the following advantages are provided in addition to protecting the protective layer against being damaged. Since the projection is close to the central hole of the disc, the load on the rotation spindle (motor), which would be otherwise caused due to the weight balance of the projection, can be alleviated, and the collision of the projection and the optical head can be avoided because the optical head accesses the information recording area outside the clamp area.

Where the projection is provided inside the claim area, the specific position of the projection may be as follows, for example, in a disc having an outer diameter of 120 mm. Where the central hole has a diameter of 15 mm and the clamp area is provided in a region from a diameter of 23 mm to a diameter of 33 mm, the projection is provided between the central hole and the clamp area, namely, in a region from a diameter of 15 mm to a diameter of 23 mm. In this case, the projection may be provided at a position a certain distance away from the central hole (for example, the projection may be separated from the edge of the central hole by equal to or more than 0.1 mm (or/and equal to or less than 0.125 mm)). Alternatively, the projection may be provided at a position a certain distance away from the clamp area (for example, the projection may be separated from the inner end of the clamp area by equal to or more than 0.1 mm (or/and equal to or less than 0.2 mm)). Still alternatively, the projection may be provided at a position a certain distance away both from the edge of the central hole and the inner end of the clamp area (specifically, the projection may be provided in a region from a diameter of 17.5 mm to a diameter of 21.0 mm). The height of the projection may be determined such that the protective layer is unlikely to be damaged or the disc is easily raised in terms of balance. If the projection is excessively high, another problem may arise. Hence, for example, the height of the projection may be equal to or less than 0.12 mm from the clamp area.

The stacking structure of the layers may be as follows. In the case of, for example, a one-sided disc used for information reproduction and/or recording with laser light incident on the side of the protective layer, where there are two or more recording layers, there are a plurality of recording layers between the substrate and the protective layer. The multi-layer structure in such a case may be as follows, for example. A reference layer (L0 layer) is provided at the position which is farthest from the light incidence surface and is away from the light incidence surface by a prescribed distance. Other layers (L1, L2, . . . Ln) are stacked on the reference layer toward the light incidence surface while the distance from the light incidence surface to the reference layer is kept the same as the distance from the light incidence surface to the recording layer in a single-layer disc (for example, about 0.1 mm). By keeping the distance to the farthest layer the same regardless of the number of layers in this manner, the following effects are provided. The compatibility can be maintained regarding the access to the reference layer. In addition, although the farthest layer is most influenced by the tilt, the influence of the tilt on the farthest layer is prevented from being increased as the number of layers increases. The reason is that the distance to the farthest layer is not increased even if the number of layers increases. By locating an area for storing the disc characteristic information or the information included therein regarding the recording density at least on the reference layer, the compatibility can also be maintained regarding the reading of such information.

Regarding the spot advancing direction/reproduction direction, either the parallel path or the opposite path is usable, for example. By the parallel path, the spot advancing direction/reproduction direction is the same in all the layers, namely, is from the innermost end toward the outermost end in all the layers, or from the outermost end toward the innermost end in all the layers. By the opposite path, where the spot advancing direction/reproduction direction is from the innermost end toward the outermost end in the reference layer (L0), the spot advancing direction/reproduction direction is from the outermost end toward the innermost end in L1 and is from the innermost end toward the outermost end in L2. Namely, the reproduction direction is from the innermost end toward the outermost end in Lm (m is 0 or an even number) and is from the outermost end toward the innermost end in Lm+1 (or is from the outermost end toward the innermost end in Lm (m is 0 or an even number) and is from the innermost end toward the outermost end in Lm+1). In this manner, the reproduction direction may be opposite between adjacent layers.

Now, the modulation system of the recording signal will be briefly described. For recording data (original source data/pre-modulation binary data) on a recording medium, the data is divided into parts of a prescribed size, and the data divided into parts of the prescribed size is further divided into frames of a prescribed length. For each frame, a prescribed sync. code/synchronization code stream is inserted (frame sync. area). The data divided into the frames is recorded as a data code stream modulated in accordance with a prescribed modulation rule matching the recording/reproduction signal characteristic of the recording medium (frame data area).

The modulation rule may be, for example, an RLL (Run Length Limited) coding system by which the mark length is limited. The notation "RLL(d, k)" means that the number of 0's appearing between 1 and 1 is d at the minimum and k at the maximum (d and k are natural numbers fulfilling d<k). For example, when d=1 and k=7, where T is the reference cycle of modulation, the length of the mark or space is 2T at the shortest and 8T at the longest. Alternatively, the modulation rule may be 1-7PP modulation, in which the following features [1] and [2] are added to the RLL(1, 7) modulation. "PP" of 1-7PP is an abbreviation of Parity preserve/Prohibit Repeated Minimum Transition Length. [1] "Parity preserve" represented by the first "P" means that whether the number of 1's of the pre-modulation source data bits is an odd number or an even number (i.e., Parity) matches whether the number of 1's of the corresponding post-modulation bit pattern is an odd number or an even number. [2] "Prohibit Repeated Minimum Transition Length" represented by the second "P" means a mechanism for limiting the number of times the shortest marks and spaces are repeated on the post-modulation recording wave (specifically, a mechanism for limiting the number of times 2T is repeated to 6).

The prescribed modulation rule is not applied to the sync. code/synchronization code stream inserted between the frames. Therefore, the sync. code/synchronization code stream can have a pattern other than the code length restricted by the modulation rule. The sync. code/synchronization code stream determines the reproduction processing timing for reproducing the recorded data and so may include any of the following patterns.

From the viewpoint of distinguishing the sync. code/synchronization code stream from the data code stream more easily, a pattern which does not appear in the data code stream may be included. For example, a mark longer than the longest mark/space included in the data code stream or a repetition of such a mark/space may be included. Where the modulation system is 1-7 modulation, the length of the mark or space is limited to 2T through 8T. Therefore, a 9T mark/space longer than 8T mark/space, or a repetition of a 9T mark/space may be included, for example.

From the viewpoint of facilitating the synchronization lock-up processing or the like, a pattern having many mark-space transfers may be included. For example, among marks/spaces included in the data code stream, a relatively short mark/space or a repetition of such a mark/space may be included. Where the modulation system is 1-7 modulation, a 2T mark/space which is the shortest, a repetition thereof, a 3T mark/space which is the second shortest or a repetition thereof may be included, for example.

Here, an area including the synchronization code stream and the data code stream is referred to as a "frame area", and a unit including a plurality of (e.g., 31) frame areas is referred to as an "address unit". In an address unit, an inter-code distance between a synchronization code stream included in an arbitrary frame area of the address unit and a synchronization code stream included in a frame area other than the arbitrary frame area may be 2 or greater. The "inter-code distance" means the number of bits which are different between two code streams. Owing to the arrangement in which the inter-code distance is 2 or greater, even if a 1-bit shift error occurs in one of the streams to be read due to an influence of noise or the like during reproduction, such a stream is not identified as the other stream by mistake. Alternatively, the inter-code distance between a synchronization code stream included in a frame area located at the start of the address unit and a synchronization code stream included in a frame area located at a position other than the start of the address unit may be 2 or greater. Owing to such an arrangement, it is easily distinguished whether the synchronization code stream is at the start or not, or whether the synchronization code stream is at the junction of address units or not.

The term "inter-code distance" encompasses an inter-code distance in an NRZ notation of the code stream in the case of NRZ recording and also an inter-code distance in an NRZI notation of the code stream in the case of NRZI recording. Therefore, in the case of recording performed by the RLL modulation, "RLL" means that the number of continuous high-level or low-level signals on the recording wave of NRZI is limited and so means that the inter-code distance is 2 or greater in the NRZI notation.

Now, the recording system for performing recording on an optical information recording medium will be described. By forming a groove in a medium, groove parts and inter-groove parts between groove parts are formed. There are various recording systems; namely, data may be recorded in the groove parts, in the inter-groove parts, or both in the groove parts and the inter-groove parts. A system of recording on a convex side as seen from the light incidence surface, among the groove parts and the inter-groove parts, is called "on-groove system", whereas a system of recording on a concave side as seen from the light incidence surface is called "in-groove system". According to the present invention, it is not specifically limited whether the on-groove system is used, the in-groove system is used, or a system of permitting either one of the two systems is used.

In the case of using the system of permitting either one of the two systems, recording system identification information which indicates whether the on-groove system or the in-groove system is used may be recorded on the medium, so that the recording system of the medium, the on-groove system or the in-groove system, can be easily identified. For a multi-layer medium, recording system identification information on each layer may be recorded. In such a case, recording system identification information on all the layers may be recorded on a reference layer (the layer farthest from the light incidence surface (L0), the layer closest to the light incidence surface, the layer to which the optical head is determined to access first after the optical disc apparatus is started, etc.). Alternatively, recording system identification information on each layer may be recorded on the respective layer, or recording system identification information on all the layers may be recorded on each layer.

The areas in which the recording system identification information can be recorded include a BCA (Burst Cutting area), a disc information area (an area which is inner or/and outer to the data recording area and mainly stores control information; in the reproduction-only area, such an area may have a track pitch larger than that of the data recording area), a wobble (recorded in superimposition on the wobble), and the like. The recording system identification information may be recorded in any one of these areas, a plurality of areas among these areas, or all of these areas.

The wobble start direction may be opposite between the on-groove system and the in-groove system. Namely, where the wobble start direction in the on-groove system is from the innermost end toward the outermost end of the disc, the wobble start direction in the in-groove system may be from the outermost end of the disc (alternatively, where the wobble start direction in the on-groove system is from the outermost end of the disc, the wobble start direction in the in-groove system may be from the innermost end of the disc). By setting the wobble start direction to be opposite between the on-groove system and the in-groove system in this manner, the tracking polarity can be the same whichever system, the on-groove system or the in-groove system, may be used. The reason is as follows. In the on-groove system, the recording is made on the convex side as seen from the light incidence side, whereas in the in-groove system, the recording is made on the concave side as seen from the light incidence side. Therefore, if the groove depth is the same in these systems, the tracking polarity is opposite. By setting the wobble start direction to be opposite between the two systems, the tracking polarity can be made the same.

The above-described in/on-groove systems are used for a recordable medium having a groove formed therein. Substantially the same concept is also applicable to a reproduction-only medium. On the reproduction-only medium, information is recorded in the form of embosses/concave and convex pits. Regarding such pits, a system of forming convex pits as seen from the light incidence surface is called "on-pit system", whereas a system of forming concave pits as seen from the light incidence surface is called "in-pit system". According to the present invention, it is not specifically limited whether the on-pit system is used, the in-pit system is used, or a system of permitting either one of the two systems is used.

In the case of using the system of permitting either one of the two systems, pit formation system identification information which indicates whether the on-pit system or the in-pit system is used may be recorded on the medium, so that which of the systems is used for the medium can be easily identified. For a multi-layer medium, pit formation system identification information on each layer may be recorded. In such a case, pit formation system identification information on all the layers may be recorded on a reference layer (the layer farthest from the light incidence surface (L0), the layer closest to the light incidence surface, the layer to which the optical head is determined to access first after the optical disc apparatus is started, etc.). Alternatively, pit formation system identification information on each layer may be recorded on the respective layer, or pit formation system identification information on all the layers may be recorded on each layer.

The areas in which the pit formation system identification information can be recorded include a BCA (Burst Cutting area), a disc information area (an area which is inner or/and outer to the data recording area and mainly stores control information; such an area may have a track pitch larger than that of the data recording area), and the like. The pit formation system identification information may be recorded in either or both of these areas.

A recording film of an optical information recording medium can have the following two recording characteristics because of the relationship between the reflectance of the recorded part and the reflectance of the unrecorded part. They are HtoL characteristic at which the reflectance of the unrecorded part is higher than the reflectance of the recorded part (High-to-Low), and LtoH characteristic at which the reflectance of the unrecorded part is lower than the reflectance of the recorded part (Low-to-High). According to the present invention, it is not specifically limited whether the HtoL characteristic is used, the LtoH characteristic is used, or either one of the two is permissible as the characteristic of the recording film of the medium.

In the case where either one of the two is permissible, recording film characteristic identification information which indicates whether the recording film has the HtoL characteristic or the LtoH characteristic may be recorded on the medium, so that it can be easily identified which characteristic the recording film has. For a multi-layer medium, recording film characteristic identification information on each layer may be recorded. In such a case, recording film characteristic identification information on all the layers may be recorded on a reference layer (the layer farthest from the light incidence surface (L0), the layer closest to the light incidence surface, the layer to which the optical head is determined to access first after the optical disc apparatus is started, etc.). Alternatively, recording film characteristic identification information on each layer may be recorded on the respective layer, or recording film characteristic identification information on all the layers may be recorded on each layer.

The areas in which the recording film characteristic identification information can be recorded include a BCA (Burst Cutting area), a disc information area (an area which is inner or/and outer to the data recording area and mainly stores control information; in the reproduction-only area, such an area may have a track pitch larger than that of the data recording area), a wobble (recorded in superimposition on the wobble), and the like. The recording film characteristic identification information may be recorded in any one of these areas, a plurality of areas among these areas, or all of these areas.

As described above, an information recording medium according to the present invention is an information recording medium including an information recording layer on which information is recordable, wherein the information recording medium is evaluated using an evaluation index which is found based on a ratio of a center of an amplitude of a reproduction signal corresponding to a second shortest mark and a second shortest space, with respect to a center of an amplitude of a reproduction signal corresponding to a longest mark and a longest space.

In an embodiment, where the information recording layer has a first recording density, the information recording medium is evaluated using a first evaluation index which is found based on a ratio of a center of an amplitude of a reproduction signal corresponding to a shortest mark and a shortest space, with respect to the center of the amplitude of the reproduction signal corresponding to the longest mark and the longest space; and where the information recording layer has a second recording density which is higher than the first recording density, the information recording medium is evaluated using a second evaluation index which is found based on the ratio of the center of the amplitude of the reproduction signal corresponding to the second shortest mark and the second shortest space, with respect to the center of the amplitude of the reproduction signal corresponding to the longest mark and the longest space.

In an embodiment, a ratio of an amplitude of a reproduction signal corresponding to a recording mark to be recorded on the information recording layer, with respect to an amplitude of a reproduction signal corresponding to a space is restricted such that a value of the evaluation index is within a prescribed range.

In an embodiment, the restriction on the ratio of the amplitude of the reproduction signal corresponding to the recording mark, with respect to the amplitude of the reproduction signal corresponding to the space is any one of restriction made such that the value of the evaluation index is −0.10 or higher; restriction made such that the value of the evaluation index is +0.15 or lower; and restriction made such that the value of the evaluation index is −0.10 or higher and +0.15 or lower.

A reproduction method in an embodiment is a method for performing reproduction from the information recording medium. The reproduction method comprises the steps of irradiating the information recording layer with a light beam; receiving light reflected by the information recording layer; and generating a reproduction signal corresponding to a recording mark recorded on the information recording layer based on the received light.

In an embodiment, the information recording medium comprises an area for storing information on a recording density of the information recording layer.

In an embodiment, the information on the recording density indicates a recording capacity of the information recording layer.

In an embodiment, the information recording medium comprises an area for storing information on a recording density of the information recording layer, wherein the information on the recording density indicates a recording capacity of the information recording layer; and where the information recording layer has the first recording density, the recording capacity is 25 gigabytes.

In an embodiment, the information on the recording density indicates a channel bit length of the information recording layer.

In an embodiment, the information recording layer includes a BCA area and a lead-in area; the lead-in area includes a PIC area; and the information on the recording density is recorded in the BCA area or the PIC area.

A reproduction method in an embodiment is a method for performing reproduction from the information recording medium. The reproduction method comprises the step of reproducing the information on the recording density from the BCA area or the PIC area.

In an embodiment, the information recording medium comprises a reference layer, which is an information recording layer located farthest from a light radiation surface of the information recording medium; a first information recording layer located closer to the light radiation surface than the reference layer; and a first spacer layer located between the reference layer and the first information recording layer. The reference layer includes an area for storing information on the recording density.

In an embodiment, the information recording medium further comprises a second information recording layer located closer to the light radiation surface than the first information recording layer; and a second spacer layer located between the first information recording layer and the second information recording layer. The first spacer layer has a larger width than a width of the second spacer layer.

In an embodiment, the information recording layer includes a concentric or spiral track; and where laser light used for irradiating the track has a wavelength of λ nm, an objective lens for collecting the laser light to the track has a numerical aperture NA, a shortest recording mark recordable on the track has a length of TM nm, and a shortest space has a length of TS nm, (TM+TS)<λ÷(2NA).

In an embodiment, TM+TS, which is obtained by adding the length TM of the shortest mark and the length TS of the shortest space, is less than 238.2 nm.

In an embodiment, on the information recording layer, a plurality of types of marks modulated in accordance with a prescribed modulation rule are recordable; and where the reference cycle of the modulation is T, a shortest mark has a length of 2T and a shortest space has a length of 2T.

In an embodiment, where the information recording layer has the first recording density, the information recording medium includes a concentric or spiral track, and where laser light used for irradiating the track has a wavelength of λ nm, an objective lens for collecting the laser light to the track has a numerical aperture NA, a shortest recording mark recordable on the track has a length of TM nm, and a shortest space has a length of TS nm, (TM+TS)>λ÷(2NA); and where the information recording layer has the second recording density, the information recording medium includes a concentric or spiral track, and where laser light used for irradiating the track has a wavelength of λ nm, an objective lens for collecting the laser light to the track has a numerical aperture NA, a shortest recording mark recordable on the track has a length of TM nm, and a shortest space has a length of TS nm, (TM+TS)<λ÷(2NA).

An information recording medium according to the present invention is an information recording medium including an information recording layer on which information is recordable, wherein on the information recording layer, a recording mark restricted to have a length of xT to yT is formed in accordance with a prescribed modulation rule (T is a reference cycle of the modulation, and x and y are natural numbers fulfilling x<y); and the information recording medium is evaluated using an evaluation index which is found based on a ratio of a center of an amplitude of a reproduction signal corresponding to an (x+1)T mark and an (x+1)T space, with respect to a center of an amplitude of a reproduction signal corresponding to a yT mark and a yT space.

In an embodiment, where the information recording layer has a first recording density, the information recording medium is evaluated using a first evaluation index which is found based on a ratio of a center of an amplitude of a reproduction signal corresponding to an xT mark and an xT space, with respect to the center of the amplitude of the reproduction signal corresponding to the yT mark and the yT space; and where the information recording layer has a second recording density which is higher than the first recording density, the information recording medium is evaluated using a second evaluation index which is found based on the ratio of the center of the amplitude of the reproduction signal corresponding to the (x+1)T mark and the (x+1)T space, with respect to the center of the amplitude of the reproduction signal corresponding to the yT mark and the yT space.

A reproduction method according to the present invention is a method for performing reproduction from the information recording medium. The reproduction method comprises the steps of irradiating the information recording layer with a light beam; receiving light reflected by the information recording layer; and generating a reproduction signal corresponding to a recording mark recorded on the information recording layer based on the received light.

In an embodiment, on the information recording layer, information is recorded using a plurality of types of marks having different lengths; and a spatial frequency, which is a frequency of a reproduction signal obtained when at least one of the plurality of types of marks is reproduced, is around, or exceeds, an OTF cutoff frequency.

In an embodiment, on which a plurality of types of marks modulated in accordance with a prescribed modulation rule are recordable, wherein the prescribed modulation rule is 1-7 modulation rule.

In an embodiment, where the information recording layer has the first recording density, information is recorded using a plurality of types of marks having different lengths, and a spatial frequency, which is a frequency of a reproduction signal obtained when at least one of the plurality of types of marks is reproduced, is lower than an OTF cutoff frequency; and where the information recording layer has the second recording density, information is recorded using a plurality of types of marks having different lengths, and a spatial frequency, which is a frequency of a reproduction signal obtained when at least one of the plurality of types of marks is reproduced, is around, or exceeds, the OTF cutoff frequency.

An information recording medium according to the present invention is an information recording medium including an information recording layer on which information is recordable, wherein where the information recording layer has a first recording density, the information recording medium is evaluated using a first evaluation index which is found based on a ratio of a center of an amplitude of a reproduction signal corresponding to a shortest mark and a shortest space, with respect to a center of an amplitude of a reproduction signal corresponding to a longest mark and a longest space; and where the information recording layer has a second recording density which is higher than the first recording density, the information recording medium is evaluated using a second evaluation index which is found based on a ratio of a center of energy of an entire reproduction waveform, with respect to the center of the amplitude of the reproduction signal corresponding to the longest mark and the longest space.

In an embodiment, the relationship between a spatial frequency and a signal amplitude is defined as an OTF; a limit of reproduction, at which the signal amplitude reaches zero after decreasing substantially linearly as the spatial frequency increases, is defined as an OTF cutoff; where the spatial frequency of the shortest mark recorded on the information recording medium is lower than the OTF cutoff frequency, the information recording medium is evaluated using the first evaluation index; and where the spatial frequency of the shortest mark recorded on the information recording medium is around, or exceeds, the OTF cutoff frequency, the information recording medium is evaluated using the second evaluation index.

A reproduction method according to the present invention is a method for reproducing the information recording medium. The reproduction method comprises the steps of irradiating the information recording layer with a light beam; receiving light reflected by the information recording layer; and generating a reproduction signal corresponding to a recording mark recorded on the information recording layer based on the received light.

In an embodiment, in a method for evaluating an information recording medium including an information recording layer on which information is recordable, on the information recording layer, a plurality of types of marks modulated in accordance with a prescribed modulation rule are recordable, and where the reference cycle of the modulation is T, the information recording medium is evaluated using an evaluation index which is found based on a ratio of a center of an amplitude of a reproduction signal corresponding to a 3T mark and a 3T space, with respect to a center of an amplitude of a reproduction signal corresponding to an 8T mark and an 8T space.

In an embodiment, where the information recording layer has a first recording density, the information recording medium is evaluated using a first evaluation index which is found based on a ratio of a center of an amplitude of a reproduction signal corresponding to a 2T mark and a 2T space, with respect to the center of the amplitude of the reproduction signal corresponding to the 8T mark and the 8T space; and where the information recording layer has a second recording density which is higher than the first recording density, the information recording medium is evaluated using a second evaluation index which is found based on the ratio of the center of the amplitude of the reproduction signal corresponding to the 3T mark and the 3T space, with respect to the center of the amplitude of the reproduction signal corresponding to the 8T mark and the 8T space.

A reproduction method according to the present invention is a method for reproducing an information recording medium evaluated by the evaluation method. The reproduction method comprises the steps of irradiating the information recording layer with a light beam; receiving light reflected by the information recording layer; and generating a reproduction signal corresponding to a recording mark recorded on the information recording layer based on the received light.

A reproduction method according to the present invention is a method for evaluating an information recording medium including an information recording layer on which information is recordable. On the information recording layer, a plurality of types of marks modulated in accordance with a prescribed modulation rule are recordable; where the reference cycle of the modulation is T, where the information recording layer has a first recording density, the information recording medium is evaluated using a first evaluation index which is found based on a ratio of a center of an amplitude of a reproduction signal corresponding to a 2T mark and a 2T space, with respect to a center of an amplitude of a reproduction signal corresponding to an 8T mark and an 8T space; and where the information recording layer has a second recording density which is higher than the first recording density, the information recording medium is evaluated using a second evaluation index which is found based on a ratio of a center of energy of an entire reproduction waveform, with respect to the center of the amplitude of the reproduction signal corresponding to the 8T mark and the 8T space.

A reproduction method in an embodiment is a method for reproducing an information recording medium evaluated by the evaluation method. The reproduction method comprises the steps of irradiating the information recording layer with a light beam; receiving light reflected by the information recording layer; and generating a reproduction signal corresponding to a recording mark recorded on the information recording layer based on the received light.

An information recording medium according to an embodiment of the present invention is an information recording medium including an information recording layer on which information is recordable. The relationship between a spatial frequency and a signal amplitude is defined as an OTF; and a limit of reproduction, at which the signal amplitude reaches zero after decreasing substantially linearly as the spatial frequency increases, is defined as an OTF cutoff. The information recording medium is evaluated using a first evaluation index which is found based on a ratio of a center of an amplitude of a shortest mark and a shortest space, with respect to a center of an amplitude of a longest mark and a longest space, and a second evaluation index which is found based on a ratio of a center of energy of an entire reproduction waveform, with respect to the center of the amplitude of the longest mark and the longest space.

In the case where the frequency of the shortest mark of the reproduction signal recorded on the information recording medium is lower than the OTF cutoff frequency, the first evaluation index is used to restrict the amplitude ratio of the recording mark to be recorded on the information recording medium and the space. In the case where the frequency of the shortest mark of the reproduction signal recorded on the information recording medium is higher than the OTF cutoff frequency, the second evaluation index is used to restrict the amplitude ratio of the recording mark to be recorded on the information recording medium and the space.

An optical disc apparatus according to an embodiment of the present invention is an optical disc apparatus for reproducing a reproduction signal recorded in an area of the information recording medium such as an optical disc medium or the like. The relationship between a spatial frequency and a signal amplitude is defined as an OTF; and a limit of reproduction, at which the signal amplitude reaches zero after decreasing substantially linearly as the spatial frequency increases, is defined as an OTF cutoff. The optical disc apparatus includes first detection means for detecting a first evaluation index which is found based on a ratio of a center of an amplitude of a shortest mark and a shortest space, with respect to a center of an amplitude of a longest mark and a longest space; and second detection means for detecting a second evaluation index which is found based on a ratio of a center of energy of an entire reproduction waveform, with respect to the center of the amplitude of the longest mark and the longest space.

In the case where the frequency of the shortest mark of the reproduction signal recorded on the information recording medium is lower than the OTF cutoff frequency, the first evaluation index is used to detect the amplitude ratio of the recording mark to be recorded on the information recording medium and the space. In the case where the frequency of the shortest mark of the reproduction signal recorded on the information recording medium is higher than the OTF cutoff frequency, the second evaluation index is used to detect the amplitude ratio of the recording mark to be recorded on the information recording medium and the space.

According to the present invention, in an information recording medium such as an optical disc or the like, in an area which has a recording linear density at which the frequency of the shortest mark is sufficiently lower than the OTF cutoff frequency and thus for which the jitter evaluation index is useful, the asymmetry index value based on the 2T amplitude is used for defining the recording quality. Thus, a stable recording medium can be provided. In an area which has a recording linear density at which the frequency of the shortest mark is around, or exceeds, the OTF cutoff frequency and thus for which the jitter evaluation index is not usable and the PR12221ML evaluation index is useful, the β index value based on the center of energy of the entire waveform is used for defining the recording quality. Thus, a stable recording medium can be provided. The recording quality significantly depends on the shape of the recording waveform as well as the recording power relating to the asymmetry index value or the β index value. For defining the recording quality relating to the recording waveform, the jitter index value or the PR12221ML evaluation index is usable. Since the recording quality of the information recorded on a recording medium is defined using a numerical value, a technique suitable to the recording linear density can be used to define the recording quality. As a result, an optical disc medium and an optical disc apparatus realizing a stable compatibility for recording and reproduction can be provided.

What is claimed is:

1. An information recording medium including an information recording layer on which information is recordable, wherein:
on the information recording layer, a recording mark restricted to have a length of xT to yT is formed in accordance with a prescribed modulation rule (T is a reference cycle of the modulation, and x and y are natural numbers fulfilling x<y); and
the information recording medium is evaluated using an evaluation index which is found based on a ratio of a center of an amplitude of a reproduction signal corresponding to an (x+1)T mark and an (x+1)T space, with respect to a center of an amplitude of a reproduction signal corresponding to a yT mark and a yT space;
where the information recording layer has a first recording density, the information recording medium is evaluated using a first evaluation index which is found based on a ratio of a center of an amplitude of a reproduction signal corresponding to an xT mark and an xT space, with respect to the center of the amplitude of the reproduction signal corresponding to the yT mark and the yT space;
where the information recording layer has a second recording density which is higher than the first recording density, the information recording medium is evaluated using a second evaluation index which is found based on a ratio of the center of the amplitude of the reproduction signal corresponding to the (x+1)T mark and the (x+1)T space, with respect to the center of the amplitude of the reproduction signal corresponding to the yT mark and the yT space;
where the information recording layer has the first recording density, information is recorded using a plurality of types of marks having different lengths, and a spatial frequency, which is a frequency of a reproduction signal obtained when at least one of the plurality of types of marks is reproduced, is lower than an optical transfer function (OTF) cutoff frequency; and where the information recording layer has the second recording density, information is recorded using a plurality of types of marks having different lengths, and a spatial frequency, which is a frequency of a reproduction signal obtained when at least one of the plurality of types of marks is reproduced, is around, or exceeds, the OTF cutoff frequency.

2. An information recording medium including an information recording layer on which information is recordable, wherein:
where the information recording layer has a first recording density, the information recording medium is evaluated using a first evaluation index which is found based on a ratio of a center of an amplitude of a reproduction signal corresponding to a shortest mark and a shortest space, with respect to a center of an amplitude of a reproduction signal corresponding to a longest mark and a longest space; and
where the information recording layer has a second recording density which is higher than the first recording density, the information recording medium is evaluated using a second evaluation index which is found based on a ratio of a center of energy of an entire reproduction waveform, with respect to the center of the amplitude of the reproduction signal corresponding to the longest mark and the longest space, wherein
the relationship between a spatial frequency and a signal amplitude is defined as an optical transfer function (OTF); a limit of reproduction, at which the signal amplitude reaches zero after decreasing substantially linearly as the spatial frequency increases, is defined as an OTF cutoff frequency;
where the spatial frequency of the shortest mark recorded on the information recording layer is lower than the OTF cutoff frequency, the information recording medium is evaluated using the first evaluation index; and
where the spatial frequency of the shortest mark recorded on the information recording layer is around, or exceeds, the OTF cutoff frequency, the information recording medium is evaluated using the second evaluation index.

* * * * *